US00RE48958E

(19) United States
(12) Reissued Patent
Strickland et al.

(10) Patent Number: US RE48,958 E
(45) Date of Reissued Patent: Mar. 8, 2022

(54) VEHICLE TO PEDESTRIAN COMMUNICATION SYSTEM AND METHOD

(71) Applicant: Honda Motor Co., Ltd., Tokyo (JP)

(72) Inventors: Richard Dean Strickland, Mooresville, NC (US); Meng Yuan, Detroit, MI (US); Xue Bai, Novi, MI (US); David W. Weber, South Lyon, MI (US); Radovan Miucic, Southfield, MI (US)

(73) Assignee: Honda Motor Co., Ltd., Tokyo (JP)

(21) Appl. No.: 16/103,533

(22) Filed: Aug. 14, 2018

Related U.S. Patent Documents

Reissue of:
(64) Patent No.: 9,421,909
Issued: Aug. 23, 2016
Appl. No.: 14/450,097
Filed: Aug. 1, 2014

U.S. Applications:
(60) Provisional application No. 61/861,886, filed on Aug. 2, 2013.

(51) Int. Cl.

| | |
|---|---|
| ***B60Q 9/00*** | (2006.01) |
| ***B60Q 1/52*** | (2006.01) |
| ***B60Q 5/00*** | (2006.01) |
| ***G08G 1/16*** | (2006.01) |
| ***G08B 21/06*** | (2006.01) |

(52) U.S. Cl.
CPC ..... *B60Q 9/008* (2013.01); *B60Q 1/525* (2013.01); *B60Q 5/006* (2013.01); *G08G 1/166* (2013.01); *G08B 21/06* (2013.01)

(58) Field of Classification Search
CPC ..... B60Q 9/008; B60Q 1/525; B60Q 5/006; G08G 1/166; G08B 21/06
See application file for complete search history.

(56) References Cited

U.S. PATENT DOCUMENTS

| | | | |
|---|---|---|---|
| 6,218,947 | B1 | 4/2001 | Sutherland |
| 6,337,637 | B1 | 1/2002 | Kubota et al. |
| 6,540,275 | B1 | 4/2003 | Iwamoto et al. |
| 7,095,336 | B2 | 8/2006 | Rodgers et al. |

(Continued)

FOREIGN PATENT DOCUMENTS

| | | | |
|---|---|---|---|
| CN | 101398982 | | 4/2009 |
| CN | 102346037 A | * | 2/2012 |

(Continued)

OTHER PUBLICATIONS

Pierre MERDRIGNAC, 'Cooperative perception and communication system for protection of vulnerable road users', National Institute for Research in Computer Science and Control, RITS—Robotics and Intelligent Transportation Systems.

(Continued)

*Primary Examiner* — Linh M Nguyen
(74) *Attorney, Agent, or Firm* — Rankin, Hill & Clark LLP

(57) ABSTRACT

A system for alerting a user includes a first device for vehicle-to-pedestrian communication. The first device is operable by a pedestrian. The system further includes a vehicle operable by a driver including a second device for vehicle-to-pedestrian communication. The system is configured to provide an alert via at least one of the first device and second device to at least one of the driver and the pedestrian.

33 Claims, 13 Drawing Sheets

(56) References Cited

U.S. PATENT DOCUMENTS

| | | | | |
|---|---|---|---|---|
| 7,202,776 | B2 | 4/2007 | Breed | |
| 7,271,736 | B2 | 9/2007 | Siegel et al. | |
| 7,375,622 | B2 | 5/2008 | Takata | |
| 7,379,813 | B2 * | 5/2008 | Kubota | G08G 1/0962 701/300 |
| 7,576,639 | B2 | 8/2009 | Boyles et al. | |
| 7,629,899 | B2 | 12/2009 | Breed | |
| 7,630,806 | B2 | 12/2009 | Breed | |
| 7,852,462 | B2 | 12/2010 | Breed et al. | |
| 7,908,060 | B2 | 3/2011 | Basson | |
| 8,093,999 | B2 | 1/2012 | Bauer et al. | |
| 8,164,432 | B2 | 4/2012 | Broggi et al. | |
| 8,195,394 | B1 | 6/2012 | Zhu et al. | |
| 8,253,589 | B2 | 8/2012 | Grimm et al. | |
| 8,340,894 | B2 | 12/2012 | Yester | |
| 8,390,440 | B2 | 3/2013 | Krautter | |
| 8,509,523 | B2 | 8/2013 | Schamp | |
| 8,547,249 | B2 | 10/2013 | David et al. | |
| 8,594,370 | B2 | 11/2013 | Schamp et al. | |
| 8,983,732 | B2 * | 3/2015 | Lisseman | B62D 1/046 701/45 |
| 2005/0149251 | A1 | 7/2005 | Donath et al. | |
| 2005/0194777 | A1 | 9/2005 | Manwaring et al. | |
| 2006/0015219 | A1 | 1/2006 | Kynast et al. | |
| 2007/0112513 | A1 | 5/2007 | Mathevon et al. | |
| 2008/0231703 | A1 | 9/2008 | Nagata et al. | |
| 2008/0243389 | A1 | 10/2008 | Inoue et al. | |
| 2009/0018711 | A1 | 1/2009 | Ueda et al. | |
| 2009/0143987 | A1 | 6/2009 | Bect et al. | |
| 2009/0171536 | A1 | 7/2009 | Zimmer | |
| 2009/0279738 | A1 | 11/2009 | Sasaki | |
| 2010/0102972 | A1 | 4/2010 | Middlekauff et al. | |
| 2010/0305858 | A1 | 12/2010 | Richardson | |
| 2011/0090093 | A1 | 4/2011 | Grimm et al. | |
| 2011/0106376 | A1 | 5/2011 | Tijerina et al. | |
| 2011/0140968 | A1 | 6/2011 | Bai et al. | |
| 2011/0199199 | A1 | 8/2011 | Perkins | |
| 2011/0254703 | A1 | 10/2011 | Li et al. | |
| 2011/0288774 | A1 | 11/2011 | Bengtsson et al. | |
| 2011/0301802 | A1 | 12/2011 | Rupp et al. | |
| 2012/0008129 | A1 | 1/2012 | Lu et al. | |
| 2012/0016581 | A1 | 1/2012 | Mochizuki | |
| 2012/0025964 | A1 | 2/2012 | Beggs et al. | |
| 2012/0068859 | A1 | 3/2012 | Mochizuki | |
| 2012/0095646 | A1 | 4/2012 | Ghazarian | |
| 2012/0129544 | A1 | 5/2012 | Hodis | |
| 2012/0144346 | A1 | 6/2012 | Meredith | |
| 2012/0296603 | A1 | 11/2012 | Kulik | |
| 2012/0300078 | A1 | 11/2012 | Ogata et al. | |
| 2012/0303271 | A1 | 11/2012 | Chowdhary | |
| 2012/0323479 | A1 | 12/2012 | Nagata | |
| 2013/0029650 | A1 | 1/2013 | Xiao et al. | |
| 2013/0060400 | A1 | 3/2013 | Hahne | |
| 2013/0144490 | A1 | 6/2013 | Lord | |
| 2013/0184980 | A1 | 7/2013 | Ichikawa et al. | |
| 2013/0187792 | A1 | 7/2013 | Egiy | |
| 2014/0051346 | A1 * | 2/2014 | Li | H04H 20/59 455/3.01 |
| 2014/0081521 | A1 | 3/2014 | Fröjdh et al. | |
| 2014/0085470 | A1 | 3/2014 | Sako et al. | |
| 2014/0112538 | A1 * | 4/2014 | Ogawa | G08G 1/166 382/103 |
| 2014/0125474 | A1 | 5/2014 | Gunaratne | |
| 2014/0142798 | A1 | 5/2014 | Guarnizo Martinez et al. | |
| 2015/0005981 | A1 | 1/2015 | Grimm et al. | |
| 2015/0035685 | A1 | 2/2015 | Strickland et al. | |
| 2015/0153184 | A1 | 6/2015 | Mudalige et al. | |
| 2015/0298693 | A1 | 10/2015 | Uechi | |
| 2015/0314783 | A1 | 11/2015 | Nespolo et al. | |
| 2016/0114800 | A1 | 4/2016 | Shimizu | |

FOREIGN PATENT DOCUMENTS

| | | | |
|---|---|---|---|
| EP | 2511121 | | 10/2012 |
| EP | 2511121 | A1 | 10/2012 |
| JP | 2003288695 | | 10/2003 |
| JP | 2004046426 | | 2/2004 |
| JP | 2004157847 | | 6/2004 |
| JP | 2006209478 | | 8/2006 |
| JP | 2008065482 | | 3/2008 |
| JP | 2010-079716 | * | 4/2010 |
| JP | 2010264912 | | 11/2010 |
| JP | 2013507691 | | 3/2013 |
| KR | 20040052725 | A * | 10/2004 |
| WO | WO2013042205 | | 3/2013 |
| WO | 2013112565 | | 8/2013 |
| WO | 2014011556 | | 1/2014 |
| WO | 2014011556 | A1 | 1/2014 |

OTHER PUBLICATIONS

Office Action of U.S. Appl. No. 14/450,097 dated Dec. 17, 2015, 14 pages.

Office Action of U.S. Appl. No. 14/566,562 dated Apr. 14, 2016, 17 pages.

Office Action of U.S. Appl. No. 14/566,562 dated Dec. 17, 2015, 21 pages.

Office Action of U.S. Appl. No. 15/673,383 dated Oct. 4, 2017, 20 pages.

Office Action of Chinese Serial No. 201410524076.4 dated Jan. 17, 2018, 8 pages.

English translation of Office Action of Chinese Serial No. 201410524076.4 dated Jan. 17, 2018, 19 pages.

Christian Voigtmann, Sian Lun Lau, Klaus David "Evaluation of a collaborative-based filter tech"; Vehicular Technology Conference; Fall 2012 IEEE, pp. 1-5.

Office Action of U.S. Appl. No. 16/107,539 dated Aug. 24, 2021, 163 pages.

Office Action of U.S. Appl. No. 16/107,539 dated Dec. 7, 2021, 16 pages.

* cited by examiner

VEHICLE TO PEDESTRIAN COMMUNICATION SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: More than one reissue application has been filed for the reissue of U.S. Pat. No. 9,421,909. The reissue applications are application Ser. No. 16/107,539, filed on Aug. 21, 2018, and Ser. No. 16/103,533 (the present application), filed on Aug. 14, 2018. Application Ser. No. 16/107,539 is a continuation reissue of Ser. No. 16/103,533.* This application is based on, claims the benefit of, and incorporates herein by reference U.S. Provisional Application No. 61/861,886, filed on Aug. 2, 2013.

BACKGROUND OF THE INVENTION

Wireless technology has the potential to enable vehicles to communicate with each other and with the infrastructure around them. Connected vehicle technology—Vehicle to Vehicle (V2V) and Vehicle to Infrastructure (V2I)—could one day alert motorists of dangerous roadway conditions, impending collisions, or dangerous curves. Connected vehicles could also "talk" to traffic signals, work zones, toll booths, school zones, and other types of infrastructure.

Connected vehicle systems are based on Dedicated Short Range Communications (DSRC)—a technology similar to Wi-Fi—which is fast, secure, reliable, and unlikely to be vulnerable to interference. Using either in-vehicle or after-market devices that continuously share important safety and mobility information, vehicles ranging from cars to trucks and buses to trains would be able to "talk" to each other and to different types of roadway infrastructure.

Analyses by the U.S. Department of Transportation's National Highway Traffic Safety Administration (NHTSA) show connected vehicle technology could potentially address approximately 80 percent of the crash scenarios involving non-impaired drivers. Specifically, NHTSA research shows that this technology could help prevent the majority of types of crashes that typically occur in the real world, such as crashes at intersections or while changing lanes.

The NHTSA announced a decision in February of 2014 to begin taking steps to enable V2V communication technology for light vehicles indicating that the NHTSA may move forward with rulemaking that would require future vehicles to support V2V and V2I data communications for safety applications. Connected V2V and V2I safety applications heavily rely on the Basic Safety Message (BSM), which is one of the messages defined in the Society of Automotive standard J2735, DSRC Message Set Dictionary, November 2009. The BSM is broadcast from vehicles over the 5.9 GHz DSRC band. Transmission range is on the order of 1,000 meters. The BSM consists of two parts (Table 1). BSM Part 1 contains core data elements, including vehicle position, heading, speed, acceleration, steering wheel angle, and vehicle size and is transmitted at an adjustable rate of about 10 times per second. BSM Part 2 contains a variable set of data elements drawn from an extensive list of optional elements. They are selected based on event triggers (e.g., ABS activated) and are added to Part 1 and sent as part of the BSM message, but are transmitted less frequently in order to conserve bandwidth. The BSM message includes only current snapshots (with the exception of path data which is itself limited to a few second's worth of past history data).

TABLE 1

Constituents of BSM Parts 1 and 2

| BSM Part 1 | BSM Part 2 |
|---|---|
| Position (local 3D): | Road coefficient of friction |
| Latitude | Rain sensor/precipitation sensor |
| Longitude | Traction Control System active over 100 msec |
| Elevation | Antilock Brake System active over 100 msec |
| Positional accuracy | Lights changed and Exterior lights (status) |
| Motion: | Wipers changed and wiper status |
| Transmission state | Ambient air temperature |
| speed | Ambient air pressure |
| heading | Vehicle type (currently only for fleet vehicles) |
| Steering wheel angle | |
| Acceleration Set (4-way): this includes 3 axes of acceleration plus yaw rate | |
| Vehicle Size | |

Although connected V2V and V2I safety applications have the potential to improve inter-vehicle communication, these applications do not address broader scenarios—specifically, Vehicle to Pedestrian (V2P) communication.

SUMMARY OF THE INVENTION

In one embodiment, the present disclosure provides a system for alerting a user. The system includes a first device for vehicle-to-pedestrian communication, the first device operable by a pedestrian, and a vehicle operable by a driver including a second device for vehicle-to-pedestrian communication. The system is configured to provide an alert via at least one of the first device and second device to at least one of the driver and the pedestrian.

In another embodiment, the present disclosure provides a method of detecting a pedestrian. The method includes communicating a first message with a first device for vehicle-to-pedestrian communication. The first device is operable by a pedestrian. The method further includes receiving the first message with a second device for vehicle to pedestrian communication and providing an alert to a user of a vehicle including the second device, the alert indicative of at least one aspect of the first message.

In a further embodiment, the present disclosure provides a method of operating a vehicle-to-pedestrian (V2P) communication system. The method includes acquiring vehicle parameters for a vehicle including a first V2P device, predicting a path of the vehicle based on at least one of the vehicle parameters, and receiving at least one Basic Safety Message (BSM) from a second V2P device associated with a pedestrian. The method further includes acquiring pedestrian parameters for the pedestrian, predicting a path of the pedestrian based on at least one of the pedestrian parameters, determining whether the path of the vehicle intersects with the path of the pedestrian, and providing an alert to at least one of a driver of the vehicle and the pedestrian.

In another embodiment, a vehicle-to-pedestrian (V2P) communication system includes a vehicle operable by a driver and configured to communicate with a first V2P device associated with the vehicle, the first V2P device configured for communicating with at least one vehicle system to acquire vehicle parameters for the vehicle including the first V2P device, the vehicle parameters including at least one of a location and a speed of the vehicle, predicting a path of the vehicle based on at least one of the vehicle parameters, receiving at least one Basic Safety Message (BSM) from a second V2P device associated with a pedestrian via a wireless communications channel, acquiring pedestrian parameters for the pedestrian from at least one of the at least one BSM and the second V2P device, the pedestrian parameters including at least one of a position and a speed of the pedestrian, determining whether the path of the vehicle intersects with a path of the pedestrian using the vehicle parameters, the at least one BSM, and the pedestrian parameters and, when the path of the vehicle intersects with the path of the pedestrian, providing an alert to at least one of a driver of the vehicle and the pedestrian.

In another embodiment, a method of operating a vehicle-to-pedestrian (V2P) communication system includes communicating with at least one vehicle system to acquire vehicle parameters for a vehicle including a first V2P device, the vehicle parameters including at least one of a location and a speed of the vehicle, predicting a path of the vehicle based on at least one of the vehicle parameters, receiving at least one Basic Safety Message (BSM) from a second V2P device associated with a pedestrian via a wireless communications channel, acquiring pedestrian parameters for the pedestrian, the pedestrian parameters including at least one of a position and a speed of the pedestrian, predicting a path of the pedestrian based on at least one of the pedestrian parameters, determining whether the path of the vehicle intersects with the path of the pedestrian, and, when the path of the vehicle intersects with the path of the pedestrian, providing an alert to at least one of a driver of the vehicle and the pedestrian.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

Like reference numerals will be used to refer to like parts from figure to figure in the following detailed description.

DETAILED DESCRIPTION OF THE INVENTION

Figure 1:
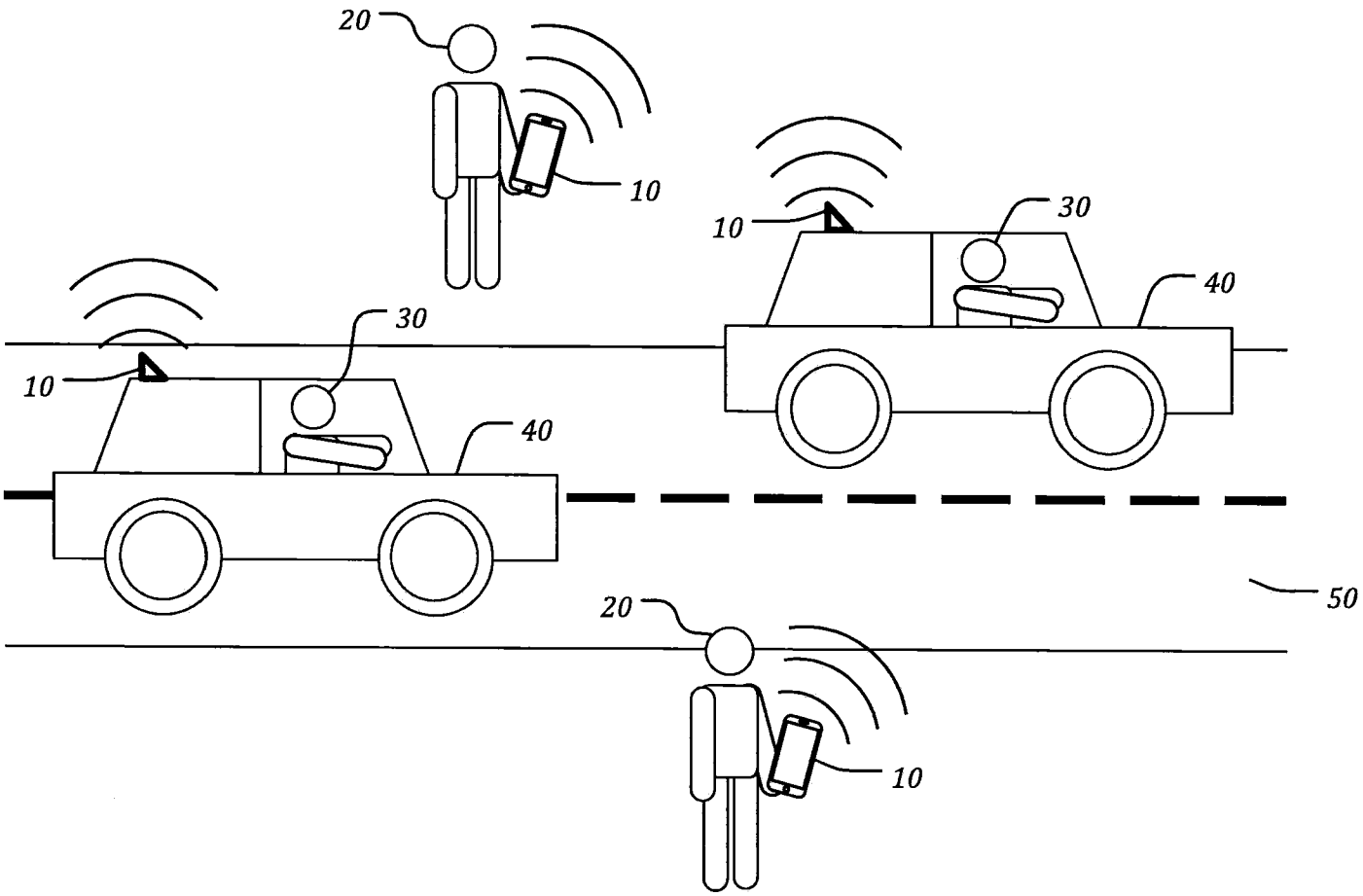
FIG. 1 is a schematic illustration of some of the components of the V2P communications system.

Although connected V2V and V2I safety applications have the potential to improve inter-vehicle communication, these applications do not address broader scenarios—specifically, V2P communication.

The present V2P communication system and method broadly address a variety of scenarios where a driver of a vehicle may come into contact with a pedestrian. In the present disclosure, a pedestrian is defined as any road user or any person in the vicinity of a road, highway, parking lot or other thoroughfare on which a vehicle may travel. In one aspect, a pedestrian may be a person on foot and in another aspect, a pedestrian may be an operator of a pedestrian transportation means such as a bicycle, unicycle, powered or unpowered wheelchair, Segway®, scooter, moped, or another similar motorized or non-motorized transportation means.

One or more algorithms may be used to distinguish among walking pedestrians, wheelchair riders, bicycle riders, Segway® riders, and the like. In one example, a device carried by a user may include a button or other interface to allow the user to indicate their status. Accordingly, a user may indicate that they are a pedestrian, on a bicycle, on a scooter and so forth. In another aspect, blind or deaf users may interface with a device to select from options such as "disability: hearing", "disability: vision", and the like. A user may manually enter a status or select from a list of predetermined options.

In another example, a device may automatically detect and/or classify the user. One method for automatic detection/classification includes identifying factors such as the kinematic behavior of the user. In one aspect, a pedestrian may have an average speed for walking of about 1-2 meter per second. Moreover, the gait or cadence of the pedestrian may be characterized by a vertical acceleration in addition to horizontal movement. In another aspect, a manual wheelchair user may have an average wheelchair speed of about 0.3 meters per second, which may be less than a pedestrian. A wheelchair user may not exhibit vertical motion. Furthermore, if a wheelchair is propelled with the hands of a user of the wheelchair (i.e., self-propelled), the intermittent turning of the wheels of the wheelchair by the user may result in speed fluctuations or pulses as opposed to the more constant speed of a pedestrian. In a yet another aspect, a powered wheelchair may have an average speed of about 0.4 meters per sec with relatively constant horizontal movement. In a further aspect, a scooter or Segway® may have an average speed of about 5-8 meters per second, with top speeds of up to or exceeding 12 meters per second. While the scooter or Segway® may behave similarly to a powered wheelchair, with relatively little to no vertical motion and a relatively constant speed, the scooter or Segway® may be differentiated from the relatively slower electrical wheelchair.

The V2P communication system and method may rely on any suitable communication medium, technology or combination thereof. In one aspect, the system may include a vehicle with at least one of a factory installed device and an aftermarket device that is integrated with the vehicle. In another aspect, the system may include a mobile device such as a smart phone, personal Global Positioning System (GPS), or a dedicated device designed explicitly for the V2P communication system. The aforementioned devices and vehicles may be operated by and/or associated with the driver of a vehicle or a pedestrian, such as a pedestrian on foot or a pedestrian in operation of a vehicle such as a one of the aforementioned pedestrian transportation means. The devices may also be referred to as V2P enabled devices. In the case of a particular example device, communication may be achieved through Wi-Fi at a frequency of 5.8 GHz or 2.4 GHz. Alternatively, communication may be carried out over DSRC at a frequency of 5.9 GHz in the United States, or at a frequency of 5.8 GHz in Europe and Japan.

In one aspect, a user of a device may or may not be able to modify the ability of a V2P device to broadcast a BSM. A V2P device may be programmed by a manufacture or vendor of the device to broadcast a BSM at a predetermined rate or under predetermined conditions. In one example, a V2P device may be programmed to broadcast a BSM every second or every 0.1 seconds. In another example, a V2P device may be programmed to determine the context of the device (e.g., indoors vs. outside) and only broadcast when a particular context is detected.

In one aspect, the device includes GPS positioning capability so that a position of a device (e.g., latitude, longitude, elevation) may be communicated to the receiving side such as a vehicle. In another aspect, the minimum processing power of a device may vary depending on the implementation of the present system and method. For example, a portion of the computation processing may be carried out on a device carried by a pedestrian or other user. The computation may include verification of incoming messages from vehicles, determination of potential threats and generation of alerts to warn the user of the device accordingly. Verification may include one or more safeguards to prevent or identify false reporting (e.g., a pedestrian on a bus) or to verify the authenticity of a message to prevent tampering with messages or the broadcasting of malevolent messages. Moreover, verification may be achieved by verifying each message's authenticity, every other messages authenticity, or every tenth message's authenticity (e.g., 10% random sampling). In one aspect, computation power requirements may be reduced by about 90% for a 10% sampling rate. Reducing processing power, or the energy used by a V2P device in general, may be useful in the case of a battery-powered device.

Communications sent and received by the V2P system include, but are not limited to BSMs. BSMs, as described above, may include one or more of the elements listed in Table 1 as well as additional elements not listed. Some of the elements that are not listed will be described herein, while still others are anticipated and will become apparent given the various embodiments of the V2P system.

In one embodiment, the V2P communication system and method may facilitate pedestrian classification. A driver of a vehicle may encounter a pedestrian with a disability, such as a pedestrian with impaired hearing or vision. Alternatively, the pedestrian may be a child or inebriated. The V2P communication system and method may identify information about the pedestrian and alert either or both of the driver and the pedestrian of the presence of the other. Moreover, the information gathered may be used to classify the pedestrian in order to tailor the alert that the driver and/or pedestrian receives.

In another embodiment, the V2P communication system and method may be used to detect a distracted driver or pedestrian and provide information such as an alert to the driver or pedestrian or both based on a given scenario. In one aspect, a distracted driver and/or pedestrian may be identified based on a detected behavior of the driver and/or pedestrian. In one aspect, the detecting device may include any of the aforementioned devices suitable in the implementation of the V2P system.

In yet another embodiment, the V2P communication system and method may be applied to detect a driver-pedestrian transition or a pedestrian cross-street intention. One algorithm for detecting a vehicle driver to pedestrian transition may include detection of the deactivation of a Bluetooth hands-free link, detection of removal of a key from the vehicle ignition, detection of the vehicle engine being turned off, or the transition of a portable device (e.g., a smart phone) from a vehicle state to a pedestrian state. In the case of the latter example, a device may be characterized by constant movement during transport in the vehicle, whereas the device may be characterized by abrupt or short movements as the device is moved from the interior of the vehicle to a location exterior to the vehicle, thereby transitioning to a portable device carried by the user (i.e., pedestrian). This abrupt and short movement may be detected by an accelerometer included in the device. Moreover, movement detection may be combined with vehicle door open and close signals, or other data acquired by the vehicle or the device in order to confirm that the device is now outside the vehicle after the driver leave the vehicle.

In one aspect, the system may detect the act (or intention) of a pedestrian entering or exiting a vehicle and provide a corresponding alert. In an exiting scenario, an alert may indicate that a pedestrian may be entering the vicinity. Conversely, in an entering scenario, an alert may indicate that a vehicle may be entering the vicinity. Furthermore, the information broadcast by the V2P system may be the result of the intention of exiting or entering a vehicle. Given the location of the user of the system relative to the vehicle, a customized alert may be generated such as an indication of the possibility of a user crossing a roadway in order to enter the vehicle.

In still another embodiment, the V2P communication system and method may be applied to predict a pedestrian trajectory. In one aspect, the system uses information provided by a device associated with the pedestrian in order to estimate a future position of the pedestrian based on history of the pedestrian, such as historical location data. Example information may include a pedestrian's every day walking path history to determine the mostly likely location of a future street crossing location and pattern. Alternative (or additional) information may include use of map data that lists street crossing, curb, or paint location information. This map data may be combined with a pedestrian's current movement to predict a crossing location and direction.

A communication system and method are provided that enable V2P communication. The V2P communication system and method broadly address a variety of scenarios where a driver of a vehicle may cross paths with a pedestrian and vice versa. Referring to FIG. 1, a pedestrian 20 may be associated with a V2P enabled device 10. In addition, a vehicle 40 with a driver 30 is shown. The driver 30 travels on a roadway 50 near the pedestrian 20. The vehicle 40 may also be associated with a V2P enabled device 10. The V2P enabled devices 10 are in communication with one another using, for example, DSRC.

Pedestrian Classification

Figure 2:
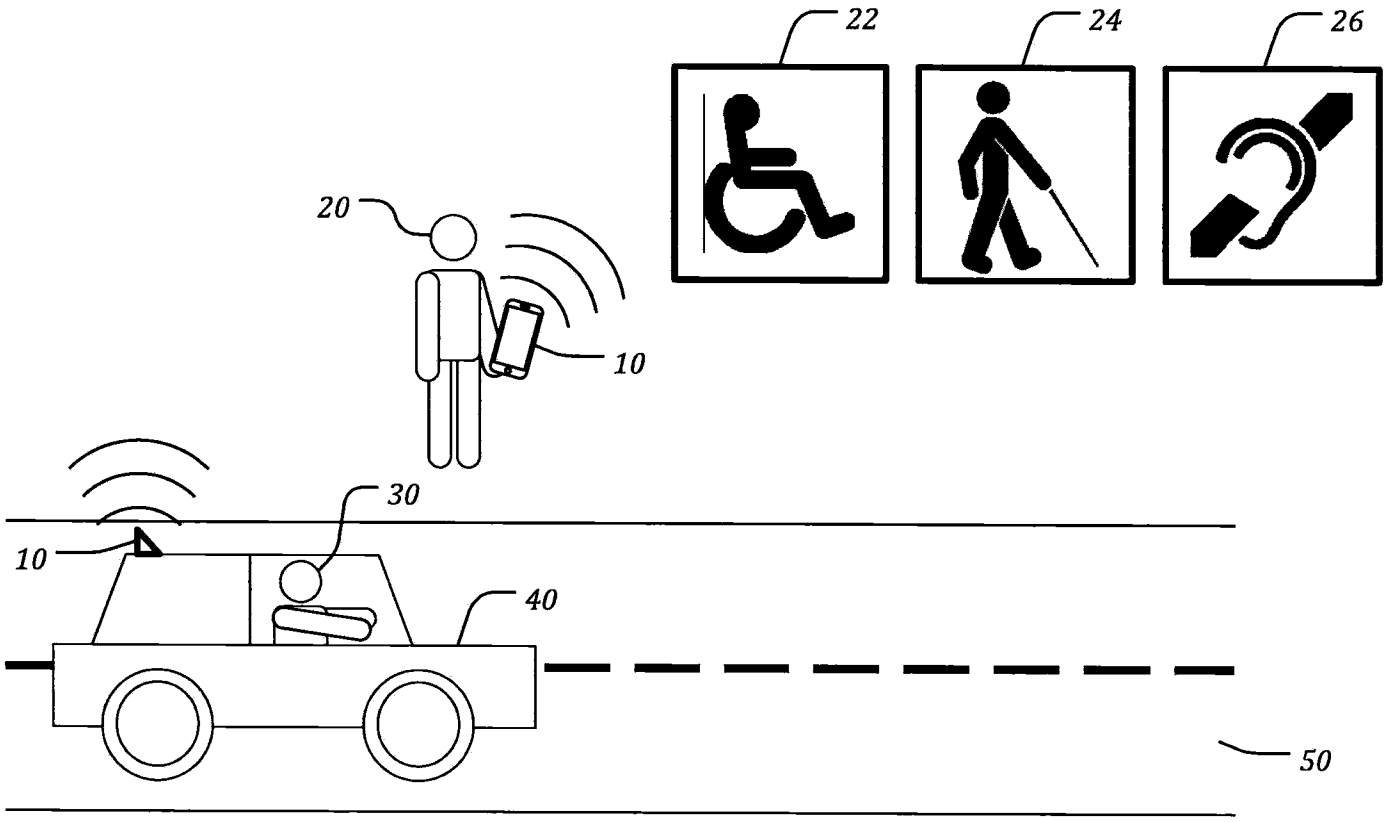
FIG. 2 is a schematic illustration of a method of pedestrian classification using the V2P system.

In one aspect, the V2P communication system and methods encompass pedestrian classification (FIG. 2). The V2P system may be capable of classifying a given pedestrian 20 as, for example, a wheelchair user 22, a blind person 24 or deaf person 26, or a regular pedestrian without disability. This classification may impact the behavior of the driver 30. Alternatively, the V2P system may control the vehicle 40 to automatically react such as through the use of an audible signal exterior to the vehicle, through the use of flashing the vehicles lights, or by engaging the braking system.

Once the device 10 carried by the pedestrian 20 detects the type and the disability classification of the user of the device 10, the device 10 may incorporate the classification information into the broadcasting of a safety message. A vehicle 40 may receive these messages and determine that the pedestrian 20 may, for example, have impaired vision. Thereafter, the vehicle 40 may actuate an audible warning such as vehicle horn to warn the pedestrian 20. If the pedestrian 20 is a wheelchair user, the vehicle 40 may actuate a brake of the vehicle 40. Accordingly, the approach of the vehicle 40 towards the pedestrian 20 in the wheelchair may be slowed to provide the wheelchair user with a greater amount of clearance or time to complete a street crossing maneuver. In one aspect, the clearance may enable the wheelchair user to feel less vulnerable as compared to a pedestrian 20 that does not require a wheelchair.

A V2P information conveyance device, such as an alert system, may accurately assess the alert timing and alert interface based on knowledge of the specific needs from a pedestrian, such as whether a disabled pedestrian requires additional street-crossing time or where the likely crossing location is—(e.g., where the road curb is graded properly for wheelchair travel).

In one implementation, for the BSM-capable mobile device users with special needs/disabilities, the device may add their special needs information as part of the BSM transmission. In that case, the user may use a setup interface provided by the mobile device to enter information describing their disabilities or special needs. In the case of a wheelchair user, for example, safety algorithms may be running on the vehicle as well as in the wheelchair user's mobile device. For example, for a wheelchair user with BSM capability in his or her mobile device, the wheelchair user's mobile device (e.g., a mobile phone or other devices capable of processing and transceiving safety messages) transmits awareness messages similar to the BSM, with additional information such as the classification of the user (e.g., physically handicapped), the classification of the pedestrians transportation means (e.g., a wheelchair) and other information, to help the vehicles and other drivers and pedestrians to identify the movement characteristics of the wheelchair user in order to perform collision threat assessment.

Other information that may be transmitted in addition to or in place of a BSM may include whether the user is listening to music, texting, talking on the phone, or browsing the internet. The vehicle, upon receiving the information transmitted by the device, may determine the probability of the pedestrian being distracted. If the vehicle determines that the probability of distraction may be likely, then the vehicle may warn the pedestrian. Example warnings may include an audible or visual alert. Moreover, the vehicle may actuate the brakes or alert the driver that a greater stopping distance may be required to account for the distracted pedestrian. By comparison, the device may warn the pedestrian by providing an audible or visual alert, by interrupting or deactivating programs with which the user may be interfacing, or the like.

In one example involving a wheelchair user, the vehicle may use the BSMs received from the wheelchair user, analyze data such as lateral acceleration, longitudinal acceleration, vertical acceleration, speed, heading, yaw rate and other parameters. Furthermore, the vehicle may detect a distinctive movement pattern of the user of the device, or further classify the mobile device user as a wheelchair user. In yet another aspect, the vehicle may use this analysis, combined with the mobile device's additional user information, to confirm the wheelchair user classification. The mobile device and any systems associated with the vehicle may also use the wheelchair use information to further determine the wheelchair user's potential road crossing location, which may be restricted to the crosswalk curbs that are properly graded for wheelchair access.

In one aspect, a cooperative safety application running in the vehicle calculates the threat of potential collision with the wheelchair user. If the probability of a collision is low, the vehicle informs the driver that the wheelchair user may be present. If the probability becomes high, the vehicle warns the driver more aggressively. The probability may be calculated based on factors including the distance to collision and the time to collision. While varied algorithms may be used to calculate a probability, one example includes the use of a bounding box having multiple alert zones (see, e.g., FIG. 6). In another aspect, a similar safety application may running on the wheelchair user's mobile device, and warns the wheelchair user of whether the possibility of collision may be high. Warnings are more aggressive in the case of a wheelchair user with potentially slower movement. For example, a wheelchair user may take a longer time to cross a street compared to a non-wheelchair user. The vehicle may take into account this information while determining the warning timing, and/or extend the waiting time for the wheelchair user (or other user having a condition resulting in a lower than expected speed when crossing the street) to complete the street crossing maneuver.

In another example involving a visually impaired pedestrian, in a manner similar to the wheelchair user, the visually impaired pedestrian may be detected by their special movement pattern such as the use of a guide cane that results in a characteristic audible pattern that may be detected by a device associated with the pedestrian and be transmitted as part of the BSM from the device. Similarly, a hearing impaired pedestrian may set their V2P device to, for example, a high-vibration mode or any other suitable settings for one with a hearing impairment. Again, once the V2P device makes the determination that the pedestrian may be visually impaired, messages notifying nearby vehicles of the condition of the pedestrian may be broadcast.

Classification aspects of the V2P systems and methods may also extend to the classification of children and adults. Safety algorithms may be implemented on V2P devices associated with either or both of the driver and the pedestrian. In one example, a cooperative safety application running on a device associated with a vehicle calculates the threat of potential collision with the pedestrian. If a child or similar person is detected, the vehicle informs the driver that children are present. A similar safety application may be implemented on a device associated with the child pedestrian that warns the pedestrian if there is a driver/vehicle approaching. Warnings may be tailored for children such that they are more aggressive (e.g., louder, longer), for example.

In one example, the V2P system may detect if a child or adult is carrying a V2P device by employing one or more methods. Methods may include the use of parental controls where a parent configures settings on the device associated with the child pedestrian indicating that a child is carrying the device. Alternatively, the device may use smart context sensing, including i) the use of a precise elevation threshold obtained from a GPS receiver in the device; ii) movement pattern matching (i.e., a child's movement pattern will differ from an adult's); and iii) the device (or system in communication with the device) automatically calculating the probability that a child is carrying the device based on usage factors.

Example usage factors for characterizing a user as a child may include identification of a gait, stride or cadence as the movement pattern of a child may be characterized by smaller steps or smaller horizontal movement per step as compared with an average adult. An algorithm may additionally (or alternatively) include time of day and the location information which may correspond with a school zone or the likelihood that a child is traveling to or from school. In the case of a child using a V2P smart phone, usage factors may include the browsing history, use of services such as social media and e-mail, and the type of music being played. Such factors may be analyzed, for example, with profiling algorithms to determine whether the user is a child. In a specific example, if children songs are being played on the device, an algorithm may determine that the device is currently associated with a child.

Figure 3:
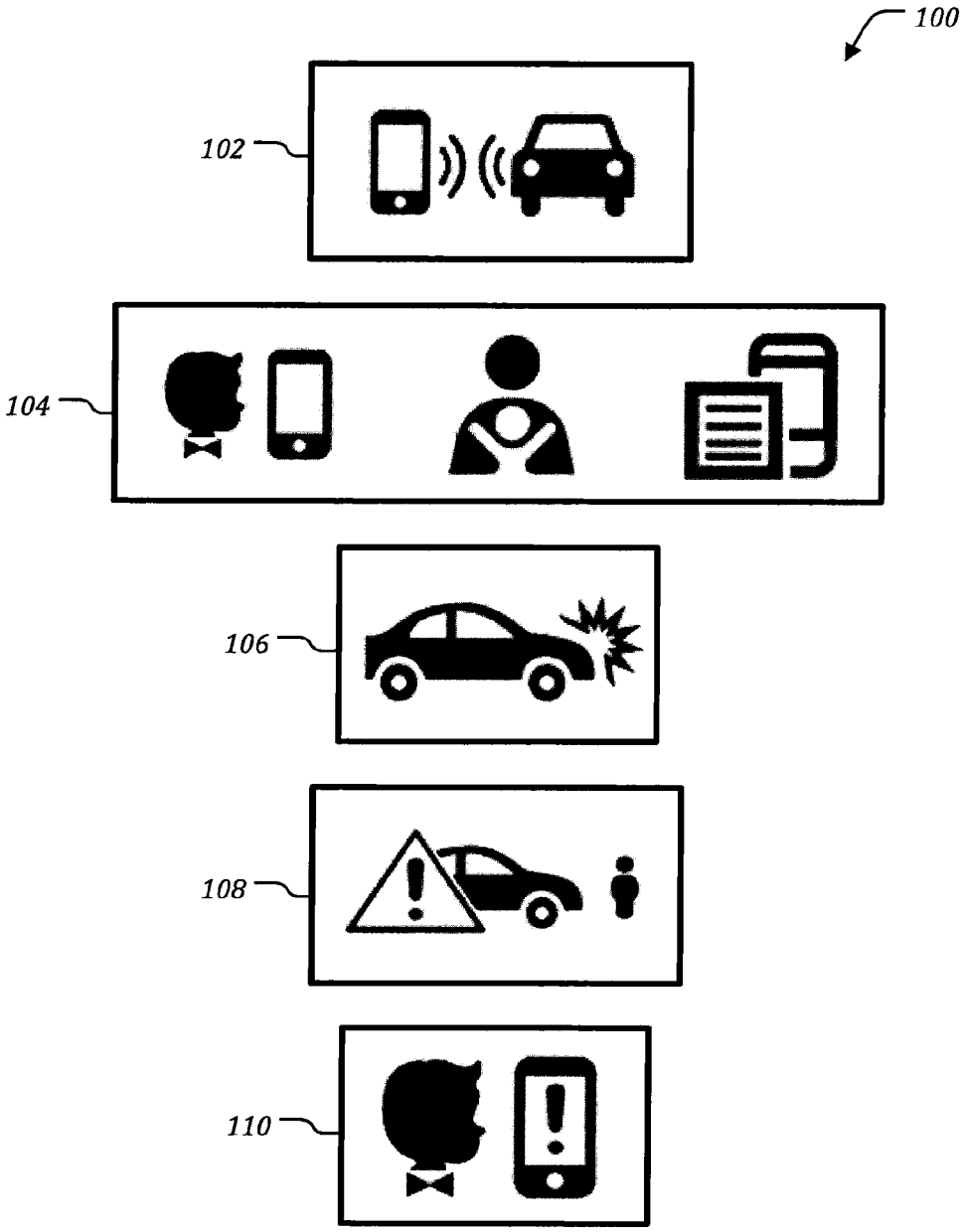
FIG. 3 shows an example method for classification of a pedestrian as a child and a potential outcome of the classification.
Figure 4:
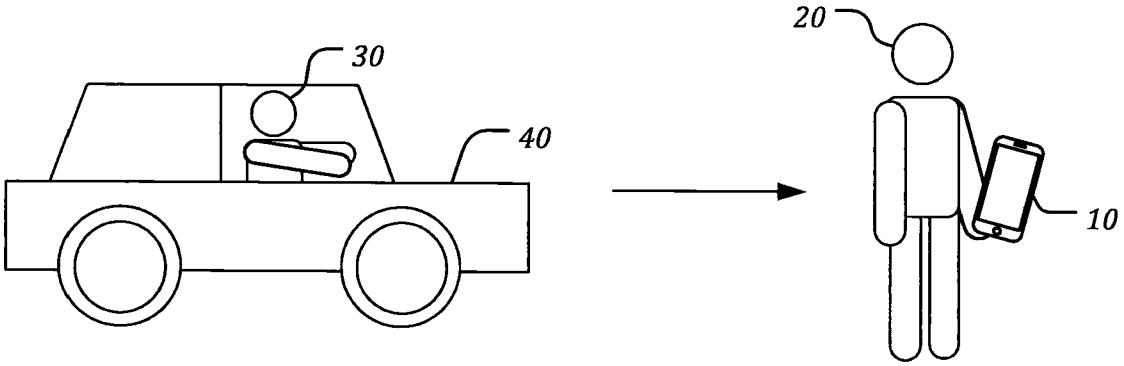
FIG. 4 is a schematic illustration of a driver to pedestrian transition.
Figure 5:
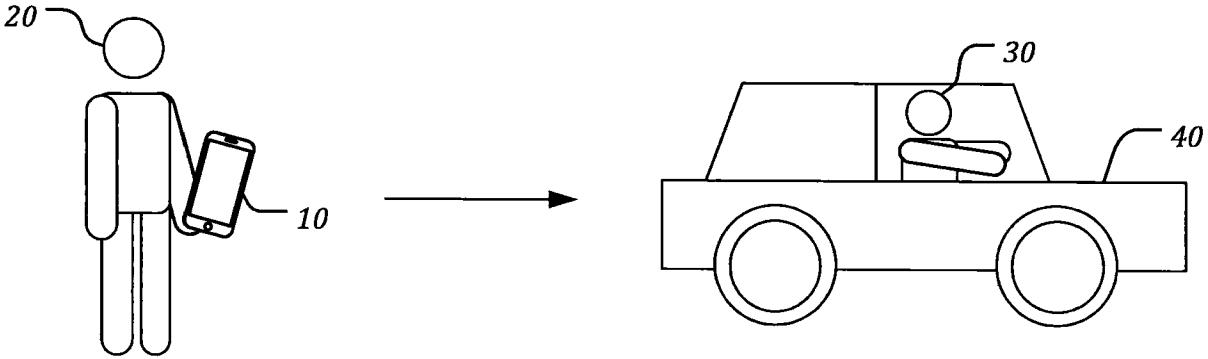
FIG. 5 is a schematic illustration of a pedestrian to driver transition.

Referring to FIG. 3, a method 100 is illustrated. In 102, a device such as a smart phone and a device associated with a vehicles periodically (or frequently) transmit awareness messages. In 104, an awareness message coming form the smart phone contains information that a child is carrying the smart phone device. This indication may be determined through the analysis of the status of parental controls on the smart phone or through precise elevation threshold data from a GPS receiver in the smart phone. In 106, a cooperative safety application running on the vehicle calculates the threat of potential collision. If a high probability of collision is calculated, the vehicle warns the driver. Then, in 108, a supporting application on the smart phone provides the pedestrian with an indication of whether the pedestrian is in a child friendly surrounding, whether there are nearby cars, and warnings of any potential collisions. Finally, in 110, if a potential collision is detected, warnings provided by the device are more aggressive and in advance in the case of children pedestrians. Pedestrian Transition Detection In another embodiment, the V2P communications system and methods may be applied to the detection of a transition state of a pedestrian (FIGS. 4-5). In one aspect, V2P enabled devices associated with the pedestrian are in communication with a vehicle to detect a driver-pedestrian transition and the intention of a pedestrian to traverse a roadway to interact with (e.g., drive) a vehicle.

In one example, the V2P system may be applied to detect a transition of a driver to a pedestrian and vice versa. This transition state information may be useful to help vehicles detect a potential pedestrian presence in the area, and may also be used to regulate a device associated with the pedestrian, for example, to turn the safety message transmission on or off for the purpose of reducing power consumption V2P applications and transmissions associated with the device.

Referring to FIG. 4, a driver 30 to pedestrian 20 transition may be detected with the V2P communications system and methods. One type of driver to pedestrian transition occurs when a driver 30 of a vehicle 40 parks the vehicle, and upon exiting the vehicle, is now classified as a pedestrian 20. The transition may be detected, for example, by a door ajar signal generated by the vehicle sensor output bus and communicated to the V2P enabled device 10 associated with the driver of the vehicle. Alternatively, or in addition, a g-sensor or other sensor output associated with the device may be used to detect the transition.

In one aspect, the accelerometer on the device 10 may provide a 3-D acceleration pattern which is characteristic of movement of a phone from an interior of the vehicle 40 (e.g., sitting on the seat in a bag, or in the pocket of the driver 30) to outside the vehicle 40. For example, after a period of generally horizontal movement while the vehicle 40 is in motion, the horizontal movement may stop as the vehicle 40 stops. Thereafter, the vertical acceleration may spike (e.g., device 10 being picked up) followed by horizontal movement (e.g., device 10 being handled within the vehicle 40), and then vertical movement as the driver 30 exits the vehicle 40 and stands up. The device 10 may then experience a typical walking related movement pattern. In one aspect, a device 10 may be able to sense operation of a door of a vehicle 40 (e.g., audible or motion characteristic, signal from vehicle 40) to predict a transition from a driver 30 to a pedestrian 20. In a further aspect, this information may be sent as part of the BSM from a device to inform the surrounding road users/drivers/pedestrians, to be alerted of a potential pedestrian presence.

Referring to FIG. 5, a pedestrian to driver transition may be detected with a V2P system. One type of pedestrian to driver transition occurs when a pedestrian 20 approaches and enters a vehicle 40 such that the pedestrian is now classified as a driver 30. The transition may be detected, for example, When a pedestrian walks towards an associated vehicle and actuates a vehicle unlock signal (e.g., with a keyless fob). The vehicle 40 associated with the pedestrian may send BSMs to inform the surrounding road users of a pedestrian approaching the vehicle. If a roadway lies in between the vehicle and the pedestrian, a device associated with the vehicle or the pedestrian may send an alert that a pedestrian is potentially intending to cross the roadway as part of a BSM. The surrounding drivers and pedestrians will be able to prepare for the presence of a pedestrian and the transition of the pedestrian to becoming a driver, along with the possibility of a roadway crossing.

In a third aspect, a number of triggers, such as a vehicle door ajar signal, starting or stopping of the engine, or a characteristic movement of a V2P enabled device associated with the driver/pedestrian may be detected in order to turn on or off the BSM transmission and related applications in order to reduce power consumption by the device. In one example, the V2P enabled device 10 is a smart phone running a V2P application. When the driver associated with the device exits a vehicle and transitions to become a pedestrian, a signal is detected, such as a door lock signal, and the application activates transmission of a BSM. At a later time, the pedestrian returns to the vehicle. Upon entering the vehicle and transitioning to a driver, a signal, such as a door unlock signal is detected and the application on the smart phone deactivates transmission of the BSM. In one example, a second V2P device integrated with the vehicle may now accept responsibility for transmitting the BSM.

Distracted Driver Detection

In yet another embodiment, the V2P system and methods, may be applied to the detection of a driver's current state of attentiveness to the surroundings, which may include the presence of one or more pedestrians. In one aspect, the reliability of detection may be improved by detecting, for example, a driver's cell phone usage information, the distance of their phone to the steering wheel, and/or the interaction of a driver with a sensor on the steering wheel.

In certain applications of the V2P system, a driver of a surrounding vehicle (peripheral driver) may be alerted to the behavior of a given driver associated with a V2P device. In one aspect, a peripheral driver may be frustrated by a slow-leading vehicle as the reason for the reduced speed of the lead vehicle is unknown. With driver distraction information exchanged among the vehicle drivers and other road users by way of the V2P system, drivers, pedestrians and other road user's anxiety levels may be reduced.

In one example, V2P technology may be based on broadcast wireless information. Each device in the system may have a unique ID. The device may broadcast information and any other device within the communication range may receive the information. Each device takes the information received from each other device within range and determines whether the information received is relevant. For example, messages received by a V2P equipped vehicle from another vehicle located 400 meters away may not be as relevant as a message received from a vehicle located 50 meters away in a blind spot of the receiving vehicle, or located 100 meters away and heading towards the receiving vehicle. In one aspect, filtering and analysis of received messages may be based on a predicted probability of collision or occurrence of another threat. Accordingly, a V2P system may be capable of monitoring and/or prioritizing multiple subjects or threats.

In another aspect, a device associated with a vehicle may detect its own driver being distracted. In one example, a range-sensitive antenna may be installed in the steering wheel to measure the distance between the steering wheel and the mobile device operated by a driver. Alternatively (or in addition to the antenna), a driver-facing camera may be used to determine a distraction state of the driver.

In certain scenarios, a driver may operate a vehicle without the use of the hands, such as in the case of the driver operating the wheel with his or her knees. A touch/load sensor may detect the use of knee-based operation of the vehicle and determine, optionally in conjunction with one or more additional sensors, the distraction state of the driver. In one implementation, a load sensor may be built into the steering column. In this case, the load on the steering column will be different if a driver has his or her hands on the steering wheel or if another extremity (e.g., knees) is incident upon the steering wheel for control. In another implementation, a touch sensor may be deployed around the perimeter of the steering wheel to detect steering without the use of the hands. In yet another implementation, the distraction state of the driver may be detected by the driver's mobile device (e.g., a smart phone). In this case, the smart phone may be configured to interface with the V2P device associated with the driver and/or the driver's vehicle. In one aspect, the V2P device and the driver's smart phone are one and the same.

Information related to the distraction state of the driver may be used by the V2P communication system in multiple ways. For example, the information may indicate to the driver's vehicle to alert the driver to a need to monitor the surrounding. The vehicle's safety system's warning timing and visual interface (if present) may be adjusted accordingly to include more aggressive warnings encompassing louder audio, more prominent visual alerts, and the like.

In another example, the information may be used as part of a BSM transmission to inform surrounding drivers and pedestrians that are capable of receiving and processing the BSMs. For example, a following vehicle may now understand that the cause of a leading vehicle's uncharacteristic deceleration is the result of mobile device usage by the offending driver. This piece of information may reduce the following vehicle driver's anxiety level and inform the driving behavior of the peripheral driver. Other drivers and pedestrians may pay extra attention to the vehicle with a distracted driver. For example, a pedestrian with a mobile device capable of processing the vehicle's BSM may be informed to be extra cautious if the pedestrian plans to cross the street.

Distracted Pedestrian Detection

In still another embodiment, the V2P communications system and method may be applicable to the detection and transmission of a pedestrian's attentiveness level. In one example, the V2P system may detect usage of a device by a pedestrian and subsequently transmit usage information related to whether the pedestrian may be playing music, texting, talking on the phone, and so forth. In certain embodiments, this information may be useful for vehicle drivers and other pedestrians with V2P enabled devices capable of BSM transmission and safety application processing. For example, the information may be used to manually or automatically adjust the vehicle's on board pedestrian warning system. For example, more aggressive timing for warnings and louder audio output external to the vehicle to warn the driver and the pedestrian may be implemented due to the expected lack of response from the pedestrian.

In one aspect, a BSM from a V2P enabled device, may be used to analyze the movement of the device (e.g., acceleration, speed, heading change, etc.) and estimate whether the device is being held in a hand or in a pocket, purse, backpack, or the like. A device carried in a pedestrian's hand will have a distinctive movement pattern compared to a device that is in a bag or in a pocket. In another aspect, a light sensor associated with the pedestrian's V2P enabled device may be used to detect if the device is held in a hand or stored in a pocket. For example, a light sensor may detect a current light level to determine whether the associated device in located within an enclosure or not. Upon the determination of the likelihood that the device associated with the pedestrian is held in the hand of the pedestrian, the device associated with the vehicle may adjust the parameters of the vehicle alert system accordingly.

In some embodiments, the detection of the distracted pedestrian may result in the presentation of a variable, situation-dependent audio/visual interface. For example, if a pedestrian is using a V2P enabled device to send a text message, a device associated with the vehicle may automatically sound the vehicle's horn to warn the pedestrian. In another example, if the pedestrian is using a device to listen to music, then a combination of flashing the vehicle's headlights and sounding the vehicle's horn may be a better contextual warning given that the pedestrian's hearing may be impaired by the use of headphones. Furthermore, for the benefit of the driver of the vehicle, an interface in the vehicle may, for example, display a context-dependent alert or adjust the timing of when the alert is provided. In the case of a visually impaired pedestrian, in one aspect, a V2P enabled device may vibrate as a warning the pedestrian.

Figure 6:
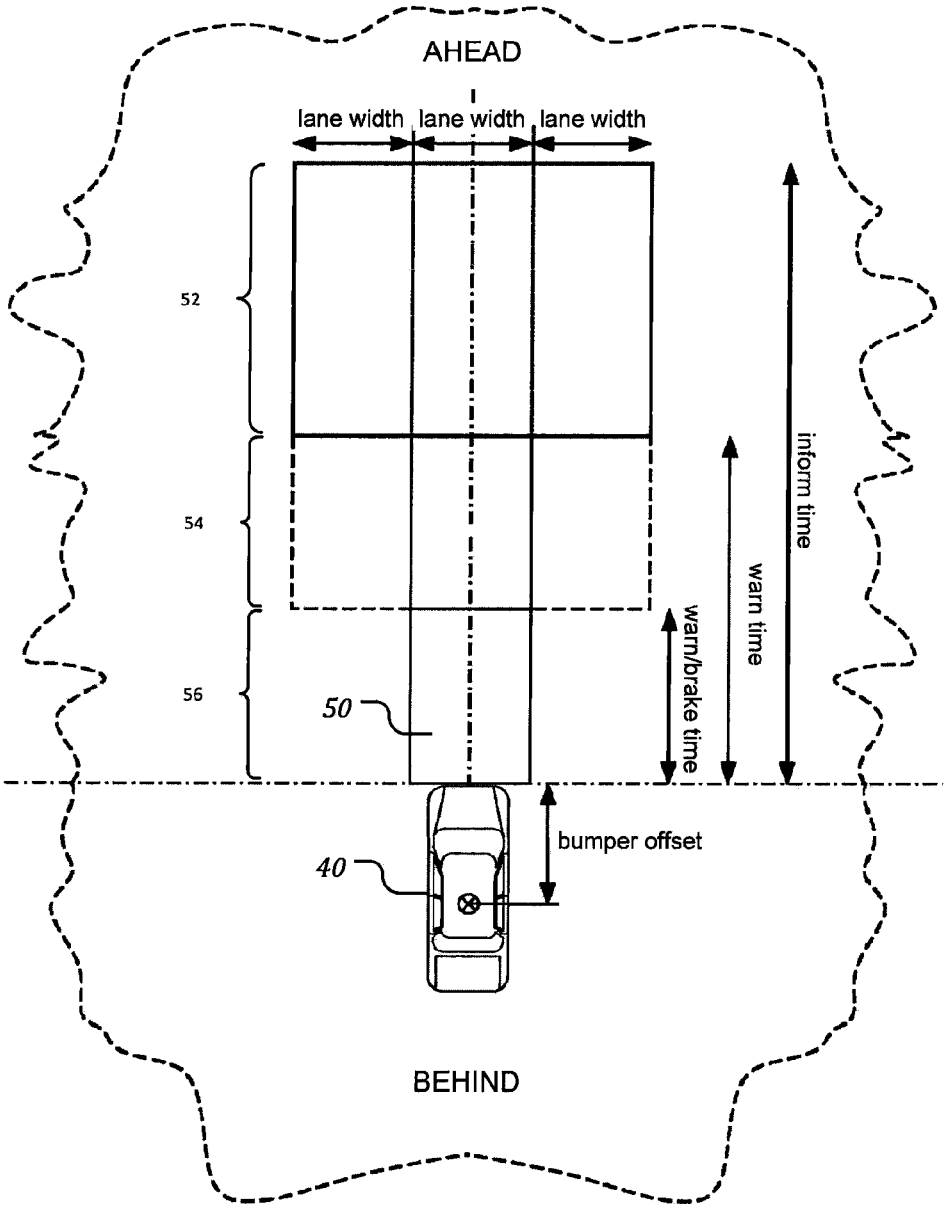
FIG. 6 is a schematic illustration of a vehicle on a roadway with overlaid alert zones.
Figure 7:
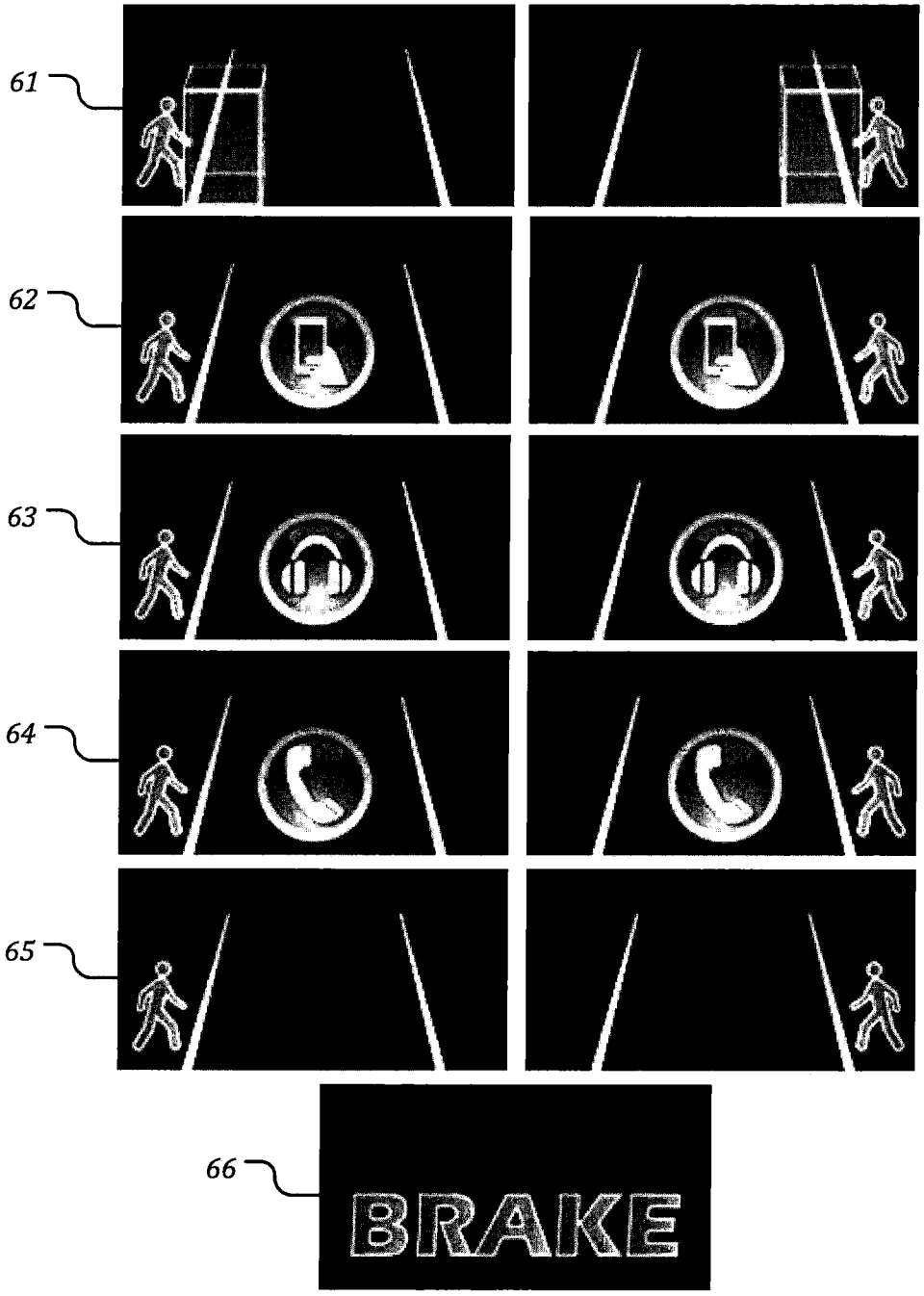
FIG. 7 is a schematic illustration of example alerts that may be provided by a visual interface.

Referring to FIG. 6, a schematic illustration is shown in which a vehicle 40 travels along a roadway 50. If a pedestrian (not shown) enters the roadway, an alert may be generated based on the distance of the pedestrian from the vehicle 40 as shown by the overlaid inform zone 52, warn zone 54, and warn/brake zone 56. In some embodiments, the inform zone 52 and warn zone 54 may include an area that is about three lane widths wide, whereas the warn/brake zone 54 may include an area that is about one lane width wide. In FIG. 7, an exemplary set of alerts are shown which may be provided to either the driver of the vehicle or the pedestrian via an interface associated with a vehicle or a device. The alerts may indicate a hidden pedestrian 61, a pedestrian distracted by operation of a device (e.g., texting) 62, a pedestrian listening to music 63, a pedestrian talking on a phone 64, and a pedestrian approaching the roadway 65.

Figure 8:
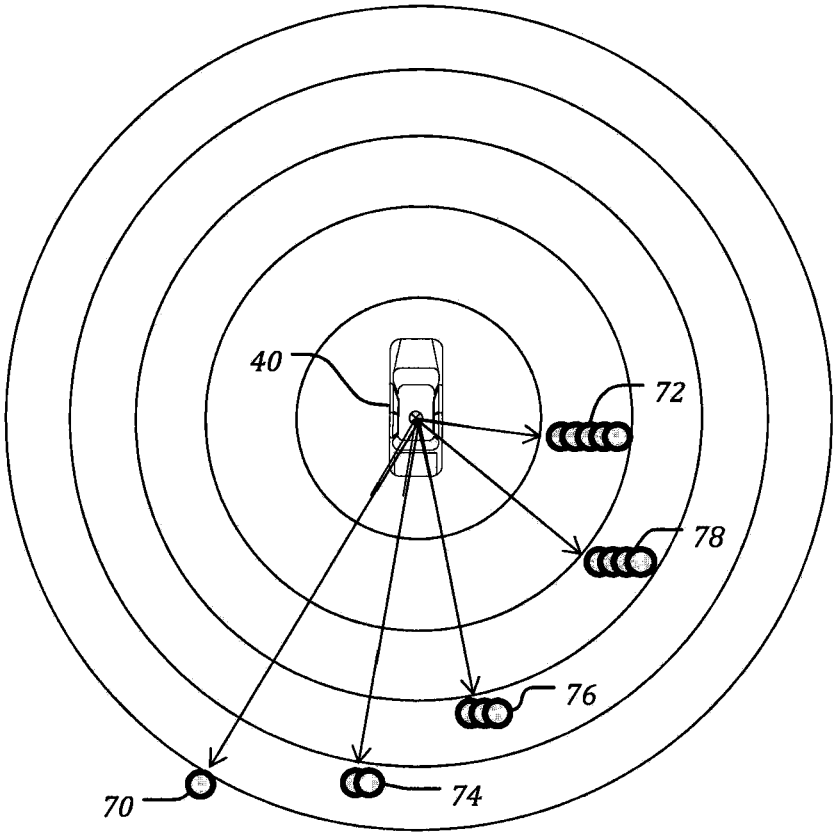
FIG. 8 is a schematic illustration of a varying alert as a function of a vehicle's distance to a pedestrian.

The alerts may be presented based on a location of the pedestrian relative to the vehicle (driver's side vs. passenger side). The alerts may also indicate that the driver should brake 66. Referring to FIG. 8, the alerts may also be specific to a distance of a pedestrian to a vehicle. For example, a single audible signal 70 may alert the driver of vehicle 40 that a pedestrian is somewhat close to the vehicle (e.g., 100 feet), whereas a multiple or repeated audible signal 72 may indicate that a pedestrian is very close to the vehicle 40 (e.g., 5 feet). Intermediate audible signals 74, 76 and 78 may include an intermediate number of repeated alerts to differentiate from the larger distance indicated by signal 70 and the smaller distance indicated by signal 72.

Furthermore, if a pedestrian is hidden behind an object such as a building, or otherwise blocked from the view of a driver, the V2P system may alert the driver in a corresponding manner (e.g., alert 61 in FIG. 7). The V2P system may, in some embodiments, be configured to detect the presence of an object, such as a tree or a building, between a driver and a vehicle. In one aspect, the location of certain objects is stored in a database accessible to a V2P enabled device. In another aspect, the hidden pedestrian may be anticipated based on the GPS coordinate of the pedestrian and the driver in conjunction with map data. For example, the pedestrian may be located on a roadway that intersects a roadway on which the driver is traveling. The presence of the intersection is determined based on map data and the location of the pedestrian and the vehicle is determined based on GPS coordinates obtained from associated V2P enabled devices. In a third aspect, a vehicle or device may be configured with a RADAR/SONAR system, video sensor (e.g., driver facing video camera) or other comparable system for the detection of objects.

In this case, if an object is detected between the vehicle and the pedestrian, the hidden pedestrian alert is presented to the driver or pedestrian. In a fourth aspect, the vehicle may be equipped with an optical device such as a front- or rear-facing camera. In this case, the optical device is configured to detect objects within a field of view. If it is determined that a pedestrian is in the vicinity of the vehicle, it may be determined that a pedestrian is hidden by an object within the filed of view of the optical device. In one example, facial recognition is used to determine if the pedestrian is visible. In another example, the information collected by the optical device and GPS coordinates of the pedestrian are combined to determine if the pedestrian is hidden.

Pedestrian Trajectory Prediction

In still another embodiment, the V2P communications system and methods may be applied to the analysis of a pedestrian's path history (e.g., GPS position vs. time) to improve, for example, vehicle-pedestrian collision warning system performance. In one aspect, the BSM from the device associated with the pedestrian may include the path history of the pedestrian, for example, as calculated by the device. This capability may be useful to assess the behavior of a pedestrian and predict the future path of the pedestrian.

In one example, a V2P enabled device associated with a pedestrian, such as mobile phone or other devices capable of processing and transceiving safety messages, frequently transmits an awareness message such as a BSM. In one aspect, the message contains additional information, such as the class of pedestrian (e.g., a child, a wheelchair user). In another aspect, a device associated with the pedestrian records a path of the pedestrian. For example the last 300 meters of the pedestrian's path are recorded on the device. The path data may be represented as an array of points including GPS, latitude, longitude, time offset, acceleration and other like attributes.

In another aspect, a vehicle may use the BSMs or other messages received from the device associated with the pedestrian and calculate the path history. The vehicle may then use the path history data to determine the probability of a future trajectory/path of the pedestrian, such as the likelihood of street-crossing. Additional information may support the calculation of the future path of the pedestrian, such as the current heading and acceleration of the pedestrian, an approach of the pedestrian to a roadway, or predicted travel path of the vehicle. Furthermore, the path history may be used to detect the movement pattern of the pedestrian, such as walking, running, jogging, hopping, or a random movement. The characteristic pattern may be analyzed by a vehicle or a device. For example, hopping may be indicative of a child pedestrian, whereas random movements may be indicative of an inebriated pedestrian.

The further classification of the pedestrian may be used to modify an alert provided by the vehicle or another device. For example, for a running pedestrian, the warning timing may be adjusted based on the speed of the pedestrian. In the case of a hopping pedestrian or an inebriated pedestrian, the vehicle may warn the driver to use caution or indicate the presence of a randomly moving pedestrian. The above system and methods also apply to the device associated with the pedestrian. In one aspect, a device safety application may use the same path history information to improve its safety application performance.

Additional scenarios for implementation of a V2P communications system & methods are described in Table 2.

TABLE 2

Exemplary Scenarios for V2P Communications System & Methods

| Category | Exemplary Embodiment(s) |
|---|---|
| Wheelchair | Device detects pedestrian is disabled and includes that information in the BSM. Vehicle adjusts warning/information accordingly. Detection of wheelchair may involve analysis of motion characteristics using G-sensor (slow moving and without periodic vertical movement) or with button input by a user. May be used for blind people, for example, by detecting cane motion/sound. |
| Path history of pedestrian | Path history of a pedestrian may be used to estimate likelihood of pedestrian crossing a street. It is more likely if history indicates fast rate of travel (walking/running), perpendicular to a street, or the like. The likelihood is reflected via an interface. Pedestrian's movement may be estimated with a G-sensor, or by detecting a walking or running rhythm. |
| Headlight control | If pedestrian is detected at night, the headlights may be made to shine in the direction of the pedestrian. Light angle changes in the presence of pedestrian or honking a horn. See also: Data fusion with camera |
| Distracted (e.g., texting) driver | Detection of a distracted driver by a driver in a following vehicle, or by surrounding infrastructure. One method to detect a distracted driver is to have a range-sensitive antenna in the steering wheel. Another method includes a driver oriented camera. Driver may be warned with a steering wheel vibration. A driver operating a vehicle without the use of the driver's hands (e.g., with knees) may be detected with a load sensor in the steering wheel or a touch sensor in the steering wheel. |
| Child with device | Methods to detect children using a device with manual input (e.g., parental controls), or smart context sensing (e.g., precise elevation threshold from GPS receiver in the device). Movement pattern may differentiate children from adults. Additional information on device may also be analyzed for identification of a child (e.g., social media login information). |
| Distracted pedestrian | Detect distracted pedestrian and present different interface to pedestrian. If pedestrian is texting, vehicle may produce audible alert (honk horn), if pedestrian is listening to music, an alert may include both an audible and a visual component (e.g., flash headlights and honk horn). For a driver, an interface may show a different display, timing of alerts may be modified, a wider alarm zone may be applied, etc. For a blind pedestrian, the pedestrian's device may vibrate. The vehicle may prepare for emergency braking. An interface of the device may provide an alert. A light sensor may be used to detect if a device is in a hand or in a pocket. |
| Vehicle to pedestrian transition | Vehicle sends a door open message to the device of the exiting pedestrian. A G-sensor in the phone may also be used to detect the transition to a pedestrian. |
| Data fusion with camera | Different interface modes are enacted when the camera cannot detect a pedestrian. If vehicle camera may detect a pedestrian and DSRC detects pedestrian, the system shows a particular warning to the driver, especially if a driver is looking forward. If only DSRC detects pedestrian but camera does not (e.g., non-line-of-sight propagation or low light/inclement weather scenario) an interface displays a different alert. |
| Using pedestrian motion | Detect walking, stopping, trotting, and the like. See also: Path history of pedestrian |
| Unlock information | Vehicle may predict that pedestrian will not cross a street. Pedestrian use of key fob (e.g., unlock button) may be detected. Alerts may be adjusted as appropriate. Internal signal, key fob, a device, and the like may have dedicated functions for integration with V2P system. |
| VRU detection using G-sensor in device | System may be used to classify certain pedestrians (e.g., a bicyclist, running pedestrian) as higher priority objects for alert generation. See also: Path history of pedestrian |
| Sidewalk GPS information | Maps data may be used to make adjustments to an interface in order to reduce false alarms. Data may be further used to anticipate a pedestrian transition to a driver or a vehicle leaving a parking lot. Information may be used for advanced parking spot finder applications to predict a pedestrian destination. See also: Unlock information |

TABLE 2-continued

Exemplary Scenarios for V2P Communications System & Methods

| Category | Exemplary Embodiment(s) |
|---|---|
| Inebriated pedestrian | Detect characteristic movements (e.g., wandering, staggering) via motion sensor or path history. Geographic information such as distance to a public house or bar may also be used. |
| Intelligent speed adaptation (ISA) using pedestrian info | Estimate safe driving speed using pedestrian information such as distance, pedestrian path direction and speed, pedestrian distraction level, characteristic movement and the like. Geographic information, such as locations of sidewalks, crosswalks, or places common pedestrian areas may also be used. Estimated safe speed may be used to guide the driver or the speed may be limited automatically. |
| Detect a pedestrian distraction state in the absence of a message from the pedestrian | Detect a pedestrian's distraction state without using a message (BSM) from a pedestrian. One method uses the difference of a received radio or G-sensor signal from a device in a pedestrian's hand, a pocket or a bag. |
| Device to Transportation | A used (e.g., pedestrian) desires to communicate with a public/private transit operator (e.g., bus driver). Operator may be alerted to position and destination of the user. |

Further Examples

Figure 10:
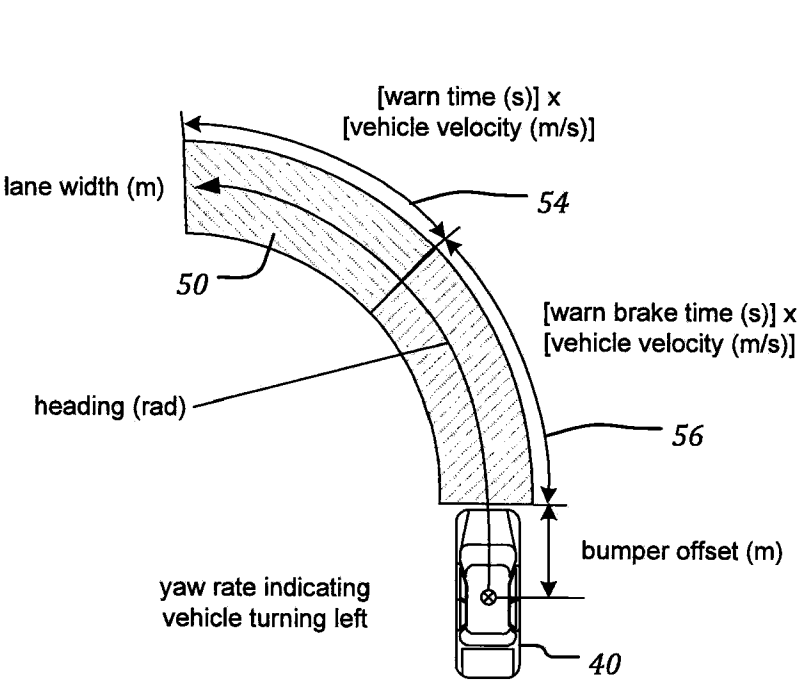
FIG. 10 is a schematic illustration of a vehicle path prediction algorithm for a vehicle with a positive yaw rate indicative of a turning maneuver.
Figure 9:
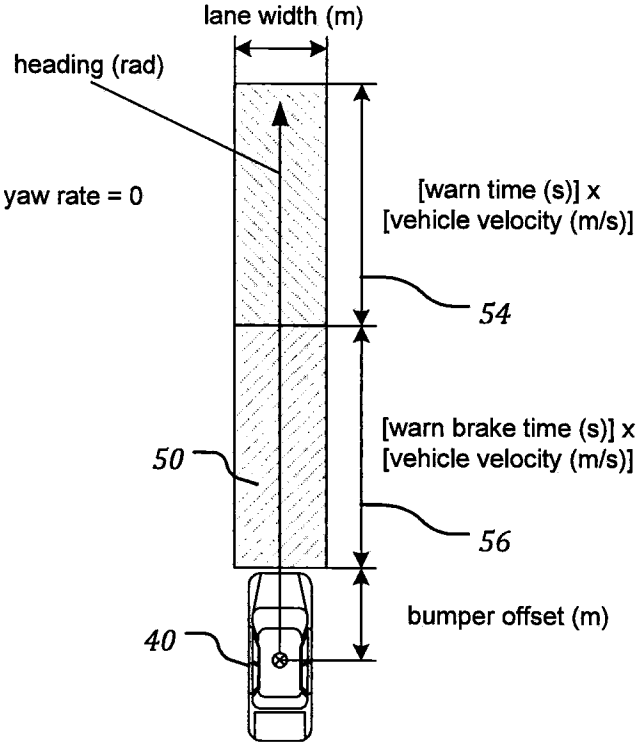
FIG. 9 is a schematic illustration of a vehicle path prediction algorithm for a vehicle with a zero yaw rate indicative of a straight path of travel.

Turning to FIGS. 9-13, example algorithms for use with a V2P communication system may include vehicle and pedestrian trajectory prediction. In one aspect, a vehicle trajectory may be predicted based on a yaw rate of the vehicle 40 (FIGS. 9 and 10). In one aspect, a yaw rate may be used to predict a heading of the vehicle 40 in radians (rad). Thereafter, the warn zone 54 and the warn/brake zone 56 may be determined based on parameters such as a known or measured lane width of the road 50 in meters (m), a bumper offset of the vehicle 40 in meters (m), or a velocity of the vehicle 40 in meters per second (m/s). The warn zone 54 and the warn/brake zone 56 may correspond to zone 54 and zone 56 illustrated in FIG. 6. A warn/brake zone 56 may include a first distance extending along a path of the vehicle 40 from the front bumper of the vehicle. The first distance may be determined based on a known or predetermined warn/brake time in seconds (s) multiplied by the current velocity (m/s) of the vehicle 40. By comparison, a warn zone 54 may include a second distance extending along a path of the vehicle 40 from the end of the warn/brake zone 56. The second distance may be determined based on a known or predetermined warn time in second (s) multiplied by the current velocity (m/s) of the vehicle 40.

Figure 11:
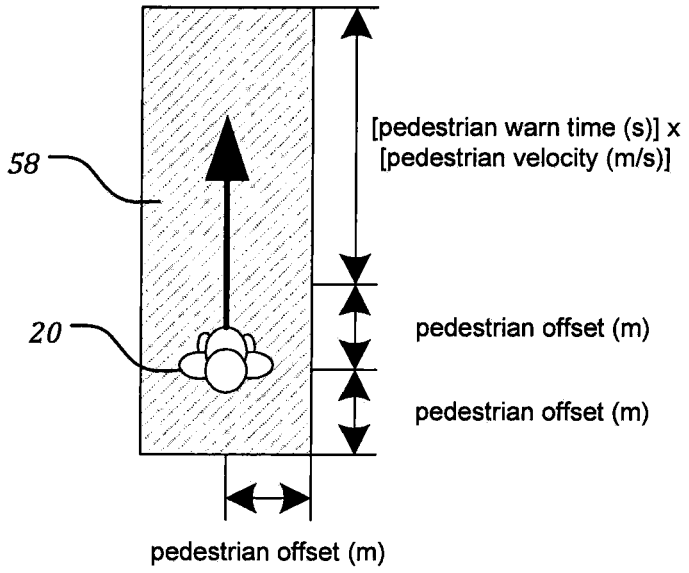
FIG. 11 is a schematic illustration of pedestrian path prediction algorithm.

With reference to FIG. 11, a pedestrian trajectory may be predicted based on a current heading of a pedestrian 20. A pedestrian zone 58 may be defined based on parameters such as a known or estimated width (offset) of the pedestrian 20 in meters (m), a pedestrian warn time (s) or a pedestrian velocity in meters per second (m/s). In one aspect, a pedestrian zone 58 may include a distance extending along a path of the pedestrian 20 from the front of the pedestrian 20 (or pedestrian offset distance). The distance may be determined based on a known pedestrian warn time (s) multiplied by the current velocity (m/s) of the pedestrian 20.

Figure 12:
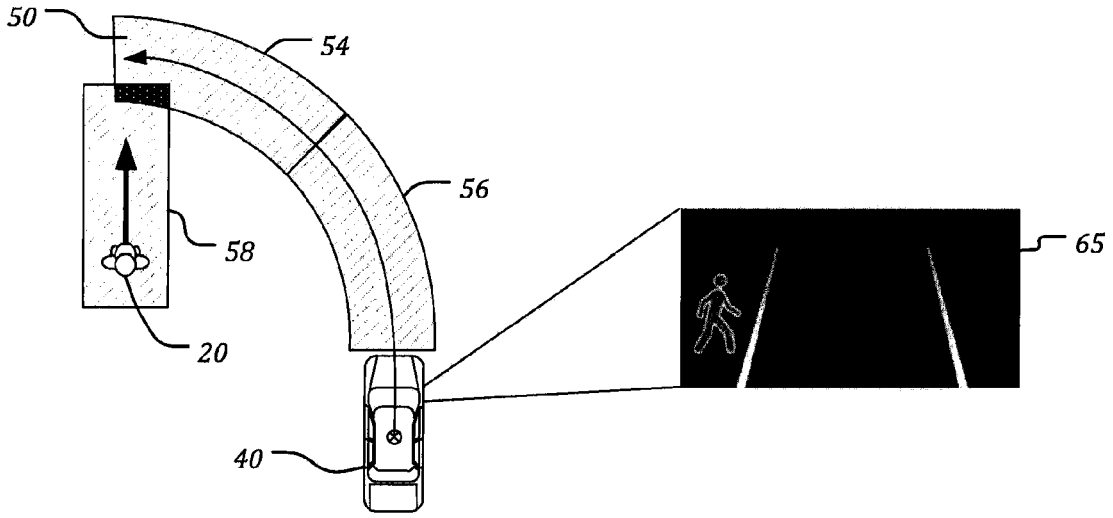
FIG. 12 is a schematic illustration of an algorithm for predicting the intersection of a pedestrian path with a vehicle path in a vehicle warn zone.
Figure 13:
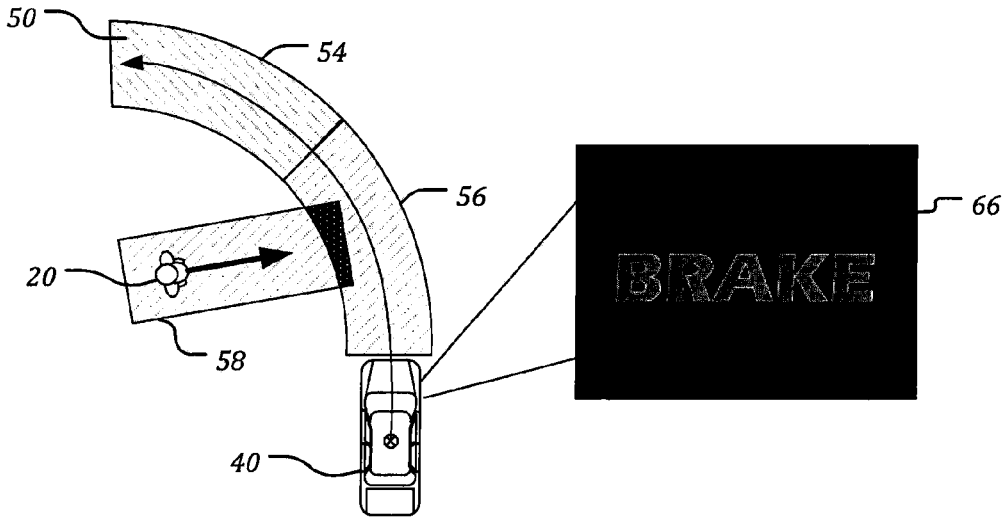
FIG. 13 is a schematic illustration of an algorithm for predicting the intersection of a pedestrian path with a vehicle path in a vehicle warn/brake zone.

In some embodiments of a V2P communication system, either a device associated with the pedestrian 20 or a device associated with vehicle 40 may be used to calculate one or more of the vehicle trajectory, vehicle warn zone 54, vehicle warn/brake zone 56, pedestrian trajectory, and pedestrian zone 58. Moreover, one or more of the aforementioned calculations may be transmitted as a component of a BSM. As shown in FIGS. 12 and 13, this information may be used to determine whether or not a pedestrian zone 58 may intersect with a vehicle warn zone 54 (FIG. 12) or warn/brake zone 56 (FIG. 13). In one aspect, if a pedestrian zone 58 intersects with a vehicle warn zone 54, then a human machine interface (HMI) or other like alert display associated with vehicle 40 may display an alert 65 indicating a pedestrian 20 approaching the roadway 50 from the left. In another aspect, if a pedestrian zone 58 intersects with a vehicle warn/brake zone 56, then an HMI associated with vehicle 40 may display an alert 66 indicating that the driver of the vehicle 40 should brake.

Figure 15:
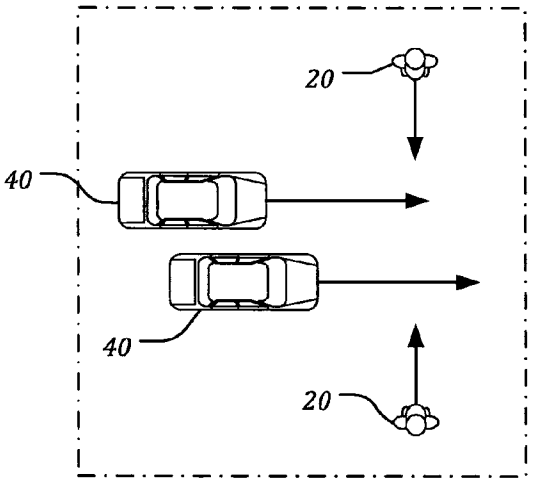
FIG. 15 is a schematic illustration of a pedestrian traveling along a generally perpendicular path to a vehicle.
Figure 14:
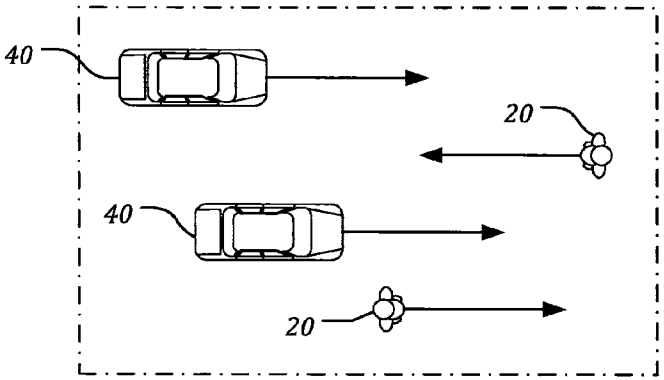
FIG. 14 is a schematic illustration of a pedestrian traveling along a generally parallel path to a vehicle.
Figure 16:
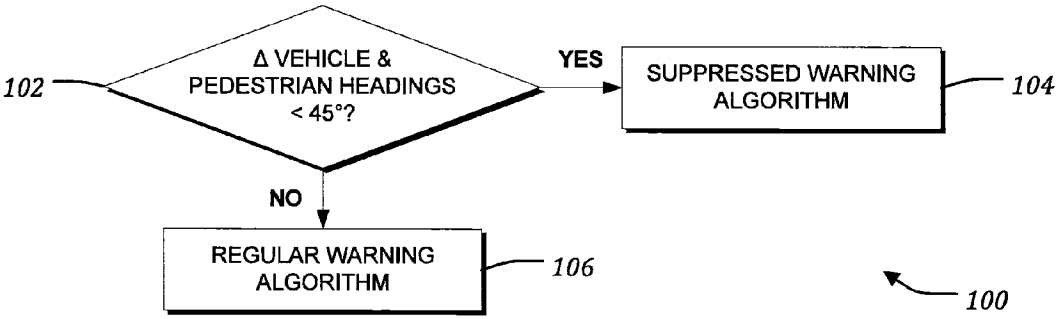
FIG. 16 is a schematic illustration of an example method for selecting between a regular warning algorithm and a suppressed warning algorithm for scenarios such as those illustrated in FIGS. 14 and 15.

Turning to FIGS. 14-16, a further example algorithm for use with a V2P communication system may include vehicle and pedestrian heading difference calculations. Using one or more trajectory prediction techniques, it may be determined that a pedestrian 20 is headed in a generally parallel direction to a vehicle 40 (FIG. 14) or that a pedestrian 20 is headed in a generally perpendicular (or other angular) direction to a vehicle 40 (FIG. 15). Accordingly a device associated with a pedestrian 20 or vehicle 40 may determine an angle between the heading or trajectory of the pedestrian 20 and the heading or trajectory of the vehicle 40. In a method 100, a determination may be made in a step 102 as to whether the angle between the headings of the pedestrian 20 and vehicle 40 is less than about 45 degrees. If the angle is less than about 45 degrees (see, e.g., FIG. 14), then in a step 104, a suppressed warning algorithm may be relied upon for further calculations by a device associated with either pedestrian 20 or vehicle 40. In one aspect, the device associated with the vehicle 40 may determine in a step 104 to suppress the display of a warning to a driver of the vehicle 40 as a pedestrian 20 travelling parallel to the vehicle 40 may not pose a threat. However, if a determination is made that the angle is greater than about 45 degrees (see, e.g., FIG. 15), then in a step 106, a regular warning algorithm may be relied upon for further calculations by a device associated with either pedestrian 20 or vehicle 40. For example, an HMI associated with the vehicle 40 may provide an alert 65 to the driver of the vehicle 40 indicating that a pedestrian is approaching from the right or left as appropriate.

Figure 17:
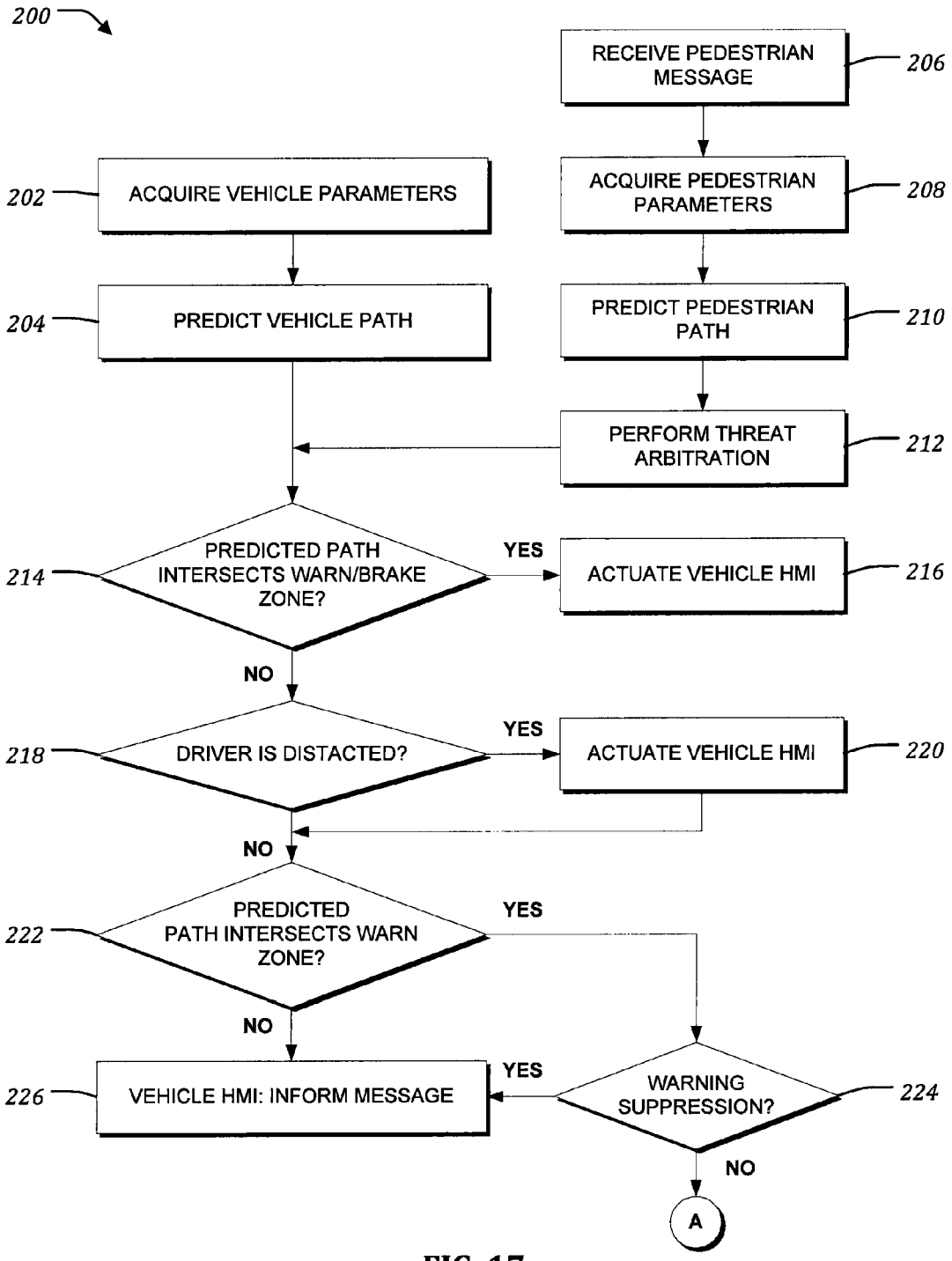
FIG. 17 is a schematic illustration of an example method for use with a V2P communication system.
Figure 18:
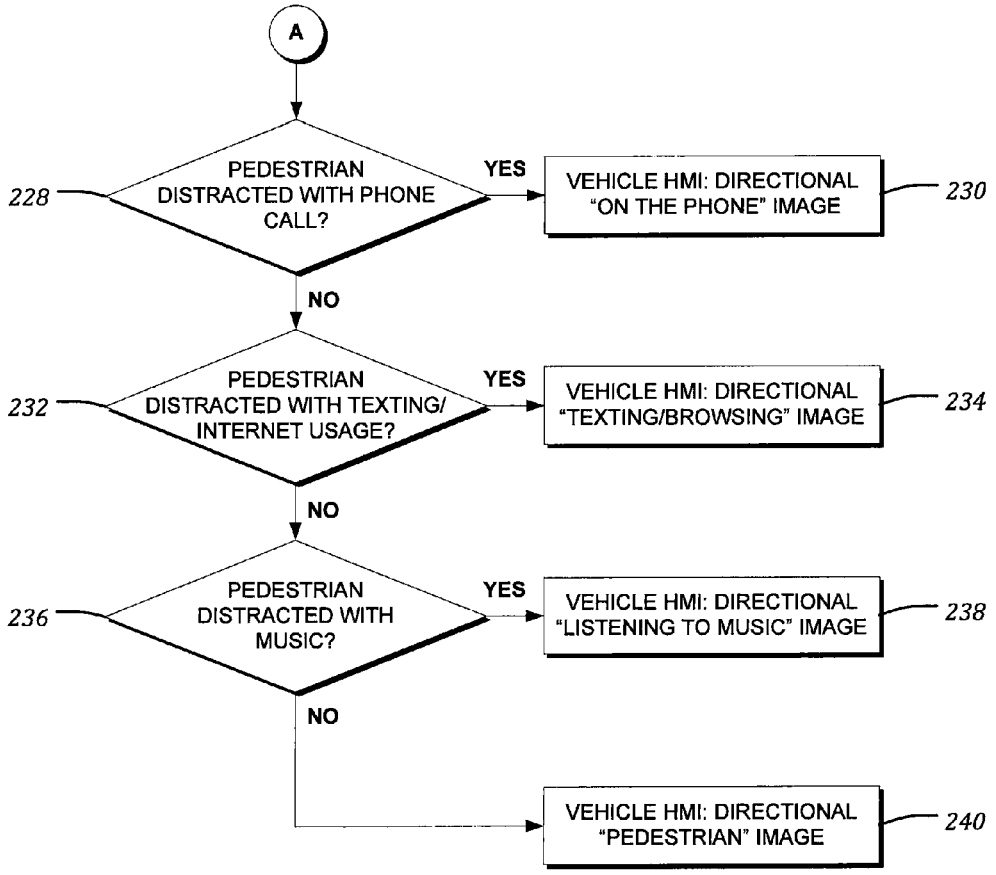
FIG. 18 is a continuation of the method of FIG. 17.

In some embodiments, a V2P communication system may include one or more methods for providing a warning or other alert to one or more pedestrians, one or more vehicle drivers, or a combination thereof. In one example, a method 200 as shown in FIGS. 17 and 18 may include a step 202 of acquiring vehicle parameters. Acquiring vehicle parameters can include measuring or recording information such as the GPS coordinates of the vehicle, the heading, speed, yaw rate, or brake state of the vehicle, the level of distraction of a driver of the vehicle, or other like information. The information may be acquired by communicating with one or more system or processor within the vehicle. The vehicle parameters acquired in the step 202 may then be used in a step 204 individually or in combination with other information to predict a path (e.g., a trajectory, heading, or the like) of the vehicle.

By comparison, a step 206 of the method 200 may include receiving a message from a pedestrian equipped with a V2P device. In one aspect, the message received in the step 206 may include information such as one or more pedestrian parameters. In another aspect, the message received in the step 206 may simply include an indication that there is a pedestrian in the vicinity of the vehicle. Thereafter, a step 208 may include acquiring one or more pedestrian parameters such as the GPS coordinates of the pedestrian, the heading, speed or movement pattern of the pedestrian, the distraction level of the pedestrian, or other like parameters. The parameters acquired in the step 208 may be used in a step 210 to predict a pedestrian path. Prediction of a pedestrian path in the step 208 and prediction of a vehicle path in the step 204 may include a preliminary analysis to determine whether there is any possibility of a collision between the pedestrian and the vehicle. Accordingly, a step 212 may include performing threat arbitration to determine the probability of a collision between a vehicle and two or more distinct pedestrians. For example, if multiple pedestrians are predicted to have a path that will intersect with a path of the vehicle, the step 212 may include determining the pedestrian with the highest probability of intersecting the path of the vehicle. Alternatively (or in addition), the step 212 may include determining which of the pedestrians may have the highest probability of intersecting the warn/brake zone of the vehicle.

With continued reference to the method 200 in FIGS. 17 and 18, a step 214 may include a determination as to whether a predicted path of the pedestrian intersects with the warn/brake zone of the vehicle. In one example, the warn/brake zone of the vehicle may be determined in the step 204. If the path of the pedestrian is determined or predicted to intersect with the warn/brake zone of the vehicle, then in a step 216, an HMI of the vehicle may be actuated to display a corresponding alert, such as the alert 66 in FIG. 7. By comparison, if the path of the pedestrian is not predicted to intersect the warn/brake zone of the vehicle in the step 214, a determination may be made as to whether or not a driver of the vehicle is distracted. A determination of a level or probability of driver distraction may be determined using any suitable method such as one or more of the methods described herein. If it is determined in the step 218 that the driver is distracted, then in a step 220, the HMI of the vehicle may be actuated to display or otherwise provide a corresponding alert, such as an audible alert to the driver. Alternatively (or in addition), an alert may be provided to the pedestrian or a driver of another vehicle indicating the distracted status of the driver. However, if the determination is made that the driver is not distracted in the step 218, or if the vehicle HMI is actuated in the step 220, then the method 200 may proceed to a step 222.

The step 222 may include a determination as to whether a predicted path of the pedestrian intersects with the warn zone of the vehicle. In one example, the warn zone of the vehicle may be determined in the step 204. If the path of the pedestrian is determined or predicted to intersect with the warn zone of the vehicle, then, in a step 224, a determination may be made as to whether or not a warning suppression feature of the V2P system is active in a step 224. If the path of the pedestrian is not predicted to intersect the warn zone of the vehicle in the step 222, or if a warning suppression feature of the V2P system is determined to be active in the step 22, then in a step 226, the HMI of the vehicle may be actuated to display or otherwise provide a corresponding alert, such a basic alert indicating the presence of a pedestrian to one side of the vehicle.

By comparison, if in the step 224 a determination is made that warning suppression is not active, then the method 200 may proceed to a step 228, for example, to determine the status of the pedestrian. The step 228 may include a determination as to whether or not a pedestrian may be distracted with a phone call. In one aspect the pedestrian may be dialing a phone number, receiving a phone call, talking on the phone, or the like. If a determination is made in the step 228 that the pedestrian may be distracted with a phone call, the vehicle HMI may be actuated in a step 230 to display a directional alert indicating the position of the pedestrian relative to the vehicle in addition to an indication of the pedestrian being distracted with a phone call (see, e.g., alert 64 in FIG. 7).

If in the step 228 a determination is made that the pedestrian is not distracted with a phone call, then the method 200 may proceed to a step 232. The step 232 may include a determination as to whether or not a pedestrian may be distracted with a text messaging or internet browsing operation. In one aspect the pedestrian may be sending, reading or receiving a text message, or may be using the phone to access the internet, interact with a web page, or the like. If a determination is made in the step 232 that the pedestrian is distracted with a text message or internet browsing operation, the vehicle HMI may be actuated in a step 234 to display a directional alert indicating the position of the pedestrian relative to the vehicle in addition to an indication of the pedestrian being distracted with a text messaging or internet browsing operation (see, e.g., alert 62 in FIG. 7).

If in the step 232 a determination is made that the pedestrian is not distracted with a text messaging or internet browsing operation, then the method 200 may proceed to a step 236. The step 236 may include a determination as to whether or not a pedestrian may be distracted listening to music. In one aspect the pedestrian may be operating a device to select a song, play a song, or the like. In another aspect, the device may detect whether the device is connected to headphones or a headset. If a determination is made in the step 232 that the pedestrian is distracted by listening to music, the vehicle HMI may be actuated in a step 238 to display a directional alert indicating the position of the pedestrian relative to the vehicle in addition to an indication of the pedestrian being distracted by listening to music (see, e.g., alert 63 in FIG. 7). By comparison, if in the step 236 a determination is made that the pedestrian is not distracted by listening to music, then the method 200 may proceed to a step 240. The step 240 may include actuating the vehicle HMI to display a basic directional alert indicating the position of the pedestrian relative to the vehicle (see, e.g., alert 65 in FIG. 7). It will be appreciated that the method 200 may include one or more additional classification steps in order to convey a status of a pedestrian or driver to another member of a V2P communication system.

The schematic flow charts shown in the figures are generally set forth as logical flow chart diagrams. As such, the depicted order and labeled steps are indicative of one embodiment of the presented methods. Other steps and methods may be conceived that are equivalent in function, logic, or effect to one or more steps, or portions thereof, of the illustrated methods. Additionally, the format and symbols employed in the figures are provided to explain the logical steps of the method and are understood not to limit the scope of the methods. Although various arrow types and line types may be employed, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

Each reference identified in the present application is herein incorporated by reference in its entirety.

What is claimed is:

1. A vehicle-to-pedestrian (V2P) communication system, comprising:

a vehicle operable by a driver and configured to communicate with a first V2P device associated with the vehicle, the first V2P device configured for:

communicating with at least one vehicle system to acquire vehicle parameters for the vehicle including the first V2P device, the vehicle parameters including at least one of a location and a speed of the vehicle;

predicting a *future* path of the vehicle based on at least one of the vehicle parameters;

receiving at least one Basic Safety Message (BSM) from a second V2P device associated with a pedestrian via a wireless communications channel;

acquiring pedestrian parameters for the pedestrian from [at least one of the at least one BSM and] the second V2P device, the pedestrian parameters including at least one of a position and a speed of the pedestrian;

determining whether the *future* path of the vehicle intersects with a *future* path of the pedestrian using the vehicle parameters, the at least one BSM, and the pedestrian parameters; and when the *future* path of the vehicle intersects with the *future* path of the pedestrian, providing [an] *a visual* alert to at least one of a driver of the vehicle and the pedestrian, wherein the *visual* alert includes a *visual* directional indication of a location of the pedestrian relative to the vehicle and at least one of an indication that the pedestrian is distracted with a phone call, an indication that the pedestrian is distracted with a text-messaging operation, an indication that the pedestrian is distracted with an Internet browsing operation, and an indication that the pedestrian is distracted by listening to music.

2. The system of claim 1, wherein the first V2P device is further configured for predicting [a] *the future* path of the pedestrian based on at least one of the pedestrian parameters.

3. The system of claim 1, wherein the first V2P device is further configured for receiving BSMs from a plurality of V2P devices associated with respective pedestrians, and performing threat arbitration to determine a probability of a collision between the vehicle and each one of the pedestrians.

4. The system of claim 1, wherein at least one of the first V2P device and the second V2P device is operable on a Dedicated Short Range Communications (DSRC) network.

5. The system of claim 1, wherein at least one of the first V2P device and the second V2P device is operable to transmit a Basic Safety Message (BSM).

6. A method of operating a vehicle-to-pedestrian (V2P) communication system, the method comprising:

communicating with at least one vehicle system to acquire vehicle parameters for a vehicle including a first V2P device, the vehicle parameters including at least one of a location and a speed of the vehicle;

predicting a *future* path of the vehicle based on at least one of the vehicle parameters;

receiving at least one Basic Safety Message (BSM) from a second V2P device associated with a pedestrian via a wireless communications channel;

acquiring pedestrian parameters for the pedestrian, the pedestrian parameters including at least one of a position and a speed of the pedestrian;

predicting a *future* path of the pedestrian based on at least one of the pedestrian parameters;

determining whether the *future* path of the vehicle intersects with the *future* path of the pedestrian; and when the *future* path of the vehicle intersects with the *future* path of the pedestrian, providing [an] *a visual* alert to at least one of a driver of the vehicle and the pedestrian, wherein the *visual* alert includes a *visual* directional indication of a location of the pedestrian relative to the vehicle and at least one of an indication that the pedestrian is distracted with a phone call, an indication that the pedestrian is distracted with a text-messaging operation, an indication that the pedestrian is distracted with an internet browsing operation, and an indication that the pedestrian is distracted by listening to music.

7. The method of claim 6, further including:

receiving BSMs from a plurality of V2P devices associated with respective pedestrians; and performing threat arbitration to determine a probability of a collision between the vehicle and the pedestrians.

8. The method of claim 6, wherein at least one of the first V2P device and the second V2P device is operable on a Dedicated Short Range Communications (DSRC) network.

9. The method of claim 6, wherein at least one of the first V2P device and the second V2P device is operable to transmit a Basic Safety Message (BSM).

10. The method of claim 9, wherein the BSM includes a classification of the pedestrian.

11. The method of claim 6, wherein the vehicle includes at least one of an audible alert system and a visual alert system perceptible by the pedestrian, and wherein the audible alert system and the visual alert system are actuatable by at least one of the first device and the second device.

12. The method of claim 6, wherein at least one of the first device and the second device is configured to detect at least one of a driver-to-pedestrian transition and a pedestrian-to-driver transition.

13. The method of claim 6, wherein at least one of the first device and the second device is configured for at least one of distracted driver detection, distracted pedestrian detection and pedestrian trajectory prediction.

*14. A vehicle-to-pedestrian (V2P) communication system, comprising a vehicle operable by a driver and including a first V2P device, the first V2P device configured for:*

*communicating with at least one vehicle system of the vehicle to acquire vehicle parameters for the vehicle, the vehicle parameters including at least one of a location and a speed of the vehicle;*

*predicting a future path of the vehicle based on at least one of the vehicle parameters;*

*acquiring pedestrian parameters from a second V2P device associated with a pedestrian via a wireless communications channel, the pedestrian parameters including at least one of a position and a speed of the pedestrian;*

*determining whether the future path of the vehicle intersects with a future path of the pedestrian using the vehicle parameters and the pedestrian parameters; and*

*when the future path of the vehicle intersects with the future path of the pedestrian, displaying a visual alert to at least one of a driver of the vehicle and the pedestrian, wherein the visual alert includes a visual directional indication of a location of the pedestrian relative to the vehicle.*

*15. The system of claim 14, wherein the first V2P device is further configured for:*

*acquiring a plurality of pedestrian parameters from a plurality of V2P devices associated with a plurality of pedestrians via a wireless communications channel, the plurality of pedestrian parameters including at least one of a position and a speed of each of the plurality of pedestrians;*

*predicting a plurality of future paths of the plurality of pedestrians based on the plurality of pedestrian parameters;*

*determining which one of the plurality of future paths of the plurality of pedestrians has a highest probability of intersecting with the future path of the vehicle.*

*16. The system of claim 14, wherein:*

*at least one of the first V2P device and the second V2P device is configured for detecting whether the pedestrian is distracted from attentiveness to a surroundings of the pedestrian; and*

*when it is detected that the pedestrian is distracted, the visual alert further includes a visual indication that the pedestrian is distracted.*

*17. The system of claim 16, wherein when it is detected that the pedestrian is distracted, the visual alert varies as a function of a type of distraction causing the pedestrian to be distracted.*

*18. The system of claim 16, wherein detecting whether the pedestrian is distracted includes detecting at least one of use of a mobile device associated with the pedestrian, movement of the mobile device, or a current light level to which the mobile device is exposed.*

*19. The system of claim 14, wherein:*

*at least one of the first V2P device and the second V2P device is configured for detecting whether the driver is distracted from attentiveness to a surroundings of the driver; and*

*when it is detected that the driver is distracted, the visual alert further includes a visual indication that the driver is distracted.*

*20. The system of claim 19, wherein detecting whether the driver is distracted includes detecting at least one of use of a mobile device associated with the driver, a distance of the mobile device to a steering wheel, or an interaction between the driver and a sensor on the steering wheel.*

*21. The system of claim 14, wherein the visual alert varies as a function of a velocity of the vehicle and a distance between the pedestrian and the vehicle.*

*22. The system of claim 14, wherein:*

*at least one of the first V2P device and the second V2P device is configured for detecting whether the pedestrian is hidden from a view of the driver; and*

*when it is detected that the pedestrian is hidden from the view of the driver, the visual alert further includes a visual indication that the pedestrian is hidden from the view of the driver.*

*23. The system of claim 22, wherein detecting whether the pedestrian is hidden from a view of the driver includes detecting a presence of an object between the pedestrian and the vehicle.*

*24. A method of operating a vehicle-to-pedestrian (V2P) communication system, the method comprising:*

*communicating with at least one vehicle system of a vehicle to acquire vehicle parameters for the vehicle including a first V2P device, the vehicle parameters including at least one of a location and a speed of the vehicle;*

*predicting a future path of the vehicle based on at least one of the vehicle parameters;*

*acquiring pedestrian parameters from a second V2P device associated with a pedestrian via a wireless communications channel, the pedestrian parameters including at least one of a position and a speed of the pedestrian;*

*predicting a future path of the pedestrian based on at least one of the pedestrian parameters;*

*determining whether the future path of the vehicle intersects with the future path of the pedestrian; and*

*when the future path of the vehicle intersects with the future path of the pedestrian, displaying a visual alert to at least one of a driver of the vehicle and the pedestrian, wherein the visual alert includes a visual directional indication of a location of the pedestrian relative to the vehicle.*

*25. The system of claim 24, the first V2P device is further configured for:*

*acquiring a plurality of pedestrian parameters from a plurality of V2P devices associated with a plurality of pedestrians via a wireless communications channel, the plurality of pedestrian parameters including at least one of a position and a speed of each of the plurality of pedestrians;*

*predicting a plurality of future paths of the plurality of pedestrians based on the plurality of pedestrian parameters;*

*determining which one of the plurality of future paths of the plurality of pedestrians has a highest probability of intersecting with the future path of the vehicle.*

*26. The system of claim 24, wherein:*

*at least one of the first V2P device and the second V2P device is configured for detecting whether the pedestrian is distracted from attentiveness to a surroundings of the pedestrian;*

*when it is detected that the pedestrian is distracted, the visual alert further includes a visual indication that the pedestrian is distracted.*

*27. The system of claim 26, wherein when it is detected that the pedestrian is distracted, the visual alert varies as a function of a type of distraction causing the pedestrian to be distracted.*

*28. The system of claim 26, wherein detecting whether the pedestrian is distracted includes detecting at least one of use of a mobile device associated with the pedestrian, movement of the mobile device, or a current light level to which the mobile device is exposed.*

*29. The system of claim 24, wherein:*

*at least one of the first V2P device and the second V2P device is configured for detecting whether the driver is distracted from attentiveness to a surroundings of the driver; and*

*when it is detected that the driver is distracted, the visual alert further includes a visual indication that the driver is distracted.*

*30. The system of claim 29, wherein detecting whether the driver is distracted includes detecting at least one of use of a mobile device associated with the driver, a distance of the mobile device to a steering wheel, or an interaction between the driver and a sensor on the steering wheel.*

*31. The system of claim 24, wherein the visual alert varies as a function of a velocity of the vehicle and a distance between the pedestrian and the vehicle.*

*32. The system of claim 24, wherein:*

*at least one of the first V2P device and the second V2P device is configured for detecting whether the pedestrian is hidden from a view of the driver; and*

*when it is detected that the pedestrian is hidden from the view of the driver, the visual alert further includes a visual indication that the pedestrian is hidden from the view of the driver.*

*33. The system of claim 32, wherein detecting whether the pedestrian is hidden from the view of the driver includes detecting a presence of an object between the pedestrian and the vehicle.*

* * * * *